(12) United States Patent
Kim

(10) Patent No.: US 11,989,389 B2
(45) Date of Patent: May 21, 2024

(54) TERMINAL SYSTEM OF TAXI VEHICLE AND OPERATING METHOD THEREOF

(71) Applicants: Hyundai Motor Company, Seoul (KR); Kia Corporation, Seoul (KR)

(72) Inventor: Sojeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/572,999

(22) Filed: Jan. 11, 2022

(65) Prior Publication Data

US 2023/0050337 A1    Feb. 16, 2023

(30) Foreign Application Priority Data

Aug. 11, 2021 (KR) .................. 10-2021-0105797

(51) Int. Cl.

| | |
|---|---|
| *G06F 3/0482* | (2013.01) |
| *G01C 21/36* | (2006.01) |
| *G08G 1/00* | (2006.01) |
| *H04M 1/72436* | (2021.01) |
| *H04W 4/024* | (2018.01) |

(52) U.S. Cl.
CPC ......... *G06F 3/0482* (2013.01); *G01C 21/362* (2013.01); *G08G 1/202* (2013.01); *H04M 1/72436* (2021.01); *H04W 4/024* (2018.02)

(58) Field of Classification Search
CPC ..... G06F 3/0482; G01C 21/36; G01C 21/362; G01C 21/3348; G01C 21/3617; G08G 1/00; G08G 1/202; H04M 1/72436; H04W 4/024; G06Q 2240/00; G06Q 50/30; G06Q 10/06311
USPC ......................................... 709/206
See application file for complete search history.

(56) References Cited

U.S. PATENT DOCUMENTS

| | | | |
|---|---|---|---|
| 10,895,462 B2 * | 1/2021 | Kassner ............. G01C 21/3605 |
| 11,068,815 B2 * | 7/2021 | Zhang .................. G06Q 10/04 |
| 11,282,155 B2 * | 3/2022 | Fu ........................ G06N 5/046 |
| 2012/0041675 A1 * | 2/2012 | Juliver ................... G06Q 10/08 |
| | | | 701/465 |
| 2013/0185152 A1 * | 7/2013 | Aaron .................. G06Q 20/322 |
| | | | 709/219 |
| 2013/0253999 A1 * | 9/2013 | Pinkus ............... G06Q 30/0265 |
| | | | 705/14.62 |
| 2015/0012310 A1 * | 1/2015 | Shen ....................... H04W 4/02 |
| | | | 705/5 |

(Continued)

*Primary Examiner* — James N Fiorillo
(74) *Attorney, Agent, or Firm* — Slater Matsil, LLP

(57) ABSTRACT

An embodiment terminal system for a taxi vehicle includes a first terminal positioned for a passenger of the taxi vehicle, and a second terminal positioned for a driver of the taxi vehicle and configured to display a first communication user interface (UI) for receiving information to be transferred from the driver to the passenger on a first screen, and in response to any one of first options included in the first communication UI being selected, to transmit first message information that is determined based on the selected any one first option to the first terminal, wherein the first options included in the first communication UI are chosen based on driving status information of the taxi vehicle, a boarding type of the passenger, or surrounding environment information of the taxi vehicle.

21 Claims, 11 Drawing Sheets

(56) References Cited

U.S. PATENT DOCUMENTS

| | | | | |
|---|---|---|---|---|
| 2016/0042303 | A1* | 2/2016 | Medina | G06Q 50/40 |
| | | | | 705/5 |
| 2017/0178269 | A1* | 6/2017 | McKinnon | G06Q 10/06311 |
| 2018/0137742 | A1* | 5/2018 | Zhang | G08B 25/08 |
| 2018/0204157 | A1* | 7/2018 | Li | G06Q 10/06311 |
| 2019/0107404 | A1* | 4/2019 | Zhong | G06Q 30/0284 |
| 2019/0265703 | A1* | 8/2019 | Hicok | G05D 1/249 |
| 2019/0304044 | A1* | 10/2019 | Guo | G06Q 10/083 |
| 2020/0094651 | A1* | 3/2020 | Ostrowski | G06N 20/00 |
| 2020/0109958 | A1* | 4/2020 | Huang | G01C 21/3617 |
| 2020/0311650 | A1* | 10/2020 | Xu | G06Q 30/0635 |
| 2020/0398638 | A1* | 12/2020 | Chuang | B60H 1/00295 |
| 2021/0068312 | A1* | 3/2021 | Tobiassen | H01M 10/625 |
| 2021/0072943 | A1* | 3/2021 | Enokida | B60K 35/10 |
| 2022/0122004 | A1* | 4/2022 | Takahara | G08G 1/202 |
| 2022/0324351 | A1* | 10/2022 | Ibanez | H01M 10/635 |
| 2023/0050337 | A1* | 2/2023 | Kim | G01C 21/362 |

* cited by examiner

TERMINAL SYSTEM OF TAXI VEHICLE AND OPERATING METHOD THEREOF

CROSS-REFERENCE TO RELATED APPLICATIONS

This application claims the benefit of Korean Patent Application No. 10-2021-0105797, filed on Aug. 11, 2021, which application is hereby incorporated herein by reference.

TECHNICAL FIELD

The present disclosure relates to a terminal system for a taxi vehicle and an operating method thereof.

BACKGROUND

A taxi vehicle providing a taxi service is equipped with a number of channels. For example, a call terminal for receiving and selecting a taxi call, a payment terminal for charging a driving fee, audio, video, navigation, taxi meter, etc. may be provided in the taxi vehicle. In some cases, a taxi driver may have to operate multiple channels while driving. This may distract the taxi driver, causing a traffic accident.

A passenger in the taxi vehicle makes a verbal request directly to the taxi driver if there is a request. A conversation between the passenger and the taxi driver may not be smooth due to a driving environment of the taxi vehicle. In this case, the taxi driver will take an action to understand the request of passenger. This causes the taxi driver's attention to be distracted. In addition, the passenger suffers from the inconvenience of having to repeatedly explain the request.

The above information disclosed in this Background section is only for enhancement of understanding of the background of the invention, and therefore, it may contain information that does not form the prior art that is already known to a person of ordinary skill in the art.

SUMMARY

The present disclosure relates to a terminal system for a taxi vehicle and an operating method thereof. Particular embodiments relate to a terminal system for a taxi vehicle supporting two-way communication between a driver and a passenger in the taxi vehicle and an operating method thereof.

Embodiments provide a terminal system for a taxi vehicle that enables smooth communication between a driver and a passenger of the taxi vehicle and an operating method thereof.

Embodiments provide a terminal system for a taxi vehicle and an operating method thereof.

An embodiment of the present invention provides a terminal system of a taxi vehicle including a first terminal for a passenger of the taxi vehicle, and a second terminal for a driver of the taxi vehicle configured to display a first communication user interface (UI) for receiving information to be transferred from the driver to the passenger on a screen, and when any one of a plurality of first options included in the first communication UI is selected, to transmit first message information that is determined depending on the selected any one first option to the first terminal. The first options included in the first communication UI may be differently selected depending on at least one of driving status information of the taxi vehicle, a boarding type of the passenger, or surrounding environment information of the taxi vehicle.

The second terminal may receive a plurality of first templates corresponding to the first options from a server, and may configure the first communication UI by using the first templates. The server may configure the first templates depending on at least one of the driving status information, the boarding type, or the surrounding environment information.

The second terminal may receive a plurality of templates corresponding to a plurality of selectable options through the first communication UI from the server, may select a plurality of first templates corresponding to the first options from among the templates depending on at least one of the driving status information, the boarding type, or the surrounding environment information, and may configure the first communication UI by using the first templates.

The driving status information may include information related to whether the taxi vehicle starts passenger transportation and whether the taxi vehicle completes the passenger transportation.

The second terminal may identify the boarding type of the passenger as boarding using a call/allocation service or boarding by roaming business based on allocation information received from a server that provides a call/allocation service.

The first options included in the first communication UI may include a destination input request when the boarding type of the passenger is identified as the boarding by the roaming business. The second terminal may transmit the first message information requesting destination input to the first terminal when a selection input for the destination input request is detected in the first communication UI.

The second terminal may generate path guide information to a destination based on destination information when the destination information is received in response to the first message information from the first terminal.

The driving status information may include an indoor temperature of the taxi vehicle, and the surrounding environment information may include an ambient temperature of the taxi vehicle. The first options included in the first communication UI may include options related to temperature adjustment when the ambient temperature of the taxi vehicle is out of a predetermined range and a difference between the indoor temperature of the taxi vehicle and the ambient temperature is greater than or equal to a predetermined value.

When the first message information is received, the first terminal may display the received first message information on the screen in the form of a pop-up window.

The first terminal may display a second communication UI for receiving information to be transmitted from the passenger to the driver on a screen, and when any one of a plurality of second options included in the second communication UI is selected, may transmit second message information that is determined depending on the selected any one second option to the second terminal. The second options included in the second communication UI may be differently selected depending on at least one of driving status information, a boarding type of the passenger, or surrounding environment information.

The first terminal may receive a plurality of second templates corresponding to the second options from a server, and may configure the second communication UI by using the second templates. The server may configure the second templates depending on at least one of the driving status information, the boarding type of the passenger, or the surrounding environment information.

The first terminal may receive a plurality of templates corresponding to a plurality of selectable options through the second communication UI from the server, may select a plurality of second templates corresponding to the second options from among the templates depending on at least one of the driving status information, the boarding type of the passenger, or the surrounding environment information, and may configure the second communication UI by using the second templates.

An embodiment of the present invention provides an operating method of a terminal system including a first terminal for a passenger of a taxi vehicle and a second terminal for a driver of the taxi vehicle, the method including displaying, by the second terminal, a first communication user interface (UI) for receiving information to be transmitted from the driver to the passenger on a screen, when any one of a plurality of first options included in the first communication UI is selected, transmitting, by the second terminal, first transmission information that is determined depending on the selected any one first option to the first terminal, and displaying, by the first terminal, the first transmission information on a screen. The first options included in the first communication UI may be differently selected depending on at least one of driving status information of the taxi vehicle, a boarding type of the passenger, or surrounding environment information of the taxi vehicle.

The operating method may further include receiving, by the second terminal, a plurality of first templates corresponding to the first options from a server, and configuring, by the second terminal, the first communication UI by using the first templates. The server may configure the first templates depending on at least one of the driving status information, the boarding type of the passenger, or the surrounding environment information.

The operating method may further include receiving, by the second terminal, a plurality of templates corresponding to a plurality of selectable options through the first communication UI from a server, selecting, by the second terminal, a plurality of first templates corresponding to the first options from among the templates depending on at least one of the driving status information, the boarding type of the passenger, or the surrounding environment information, and configuring, by the second terminal, the first communication UI by using the first templates.

The driving status information may include information related to whether the taxi vehicle starts passenger transportation or whether the taxi vehicle completes the passenger transportation.

The operating method may further include identifying, by the second terminal, the boarding type of the passenger as boarding using a call/allocation service or boarding by roaming business based on allocation information received from a server that provides a call/allocation service.

The first options included in the first communication UI may include a destination input request when the boarding type of the passenger is identified as the boarding by the roaming business. The transmitting may include transmitting the first message information requesting destination input to the first terminal when a selection input for the destination input request is detected in the first communication UI.

The operating method may further include generating, by the second terminal, path guide information to a destination based on destination information when the destination information is received in response to the first message information from the first terminal, and displaying, by the second terminal, the path guide information on a screen.

The driving status information may include an indoor temperature of the taxi vehicle, and the surrounding environment information may include an ambient temperature of the taxi vehicle. The second options included in the second communication UI may include options related to temperature adjustment when the ambient temperature of the taxi vehicle is out of a predetermined range and a difference between an indoor temperature of the taxi vehicle and the ambient temperature is greater than or equal to a second value.

The operating method may further include displaying, by the first terminal, a second communication UI for receiving information to be transmitted from the passenger to the driver on a screen, when any one of a plurality of second options included in the second communication UI is selected, transmitting, by the first terminal, second transmission information that is determined depending on the selected any one second option to the second terminal, and displaying, by the second terminal, the second transmission information on a screen. The second options included in the second communication UI may be differently selected depending on at least one of driving status information, a boarding type of the passenger, or surrounding environment information.

The operating method may further include receiving, by the first terminal, a plurality of second templates corresponding to the second options from a server, and configuring, by the first terminal, the second communication UI by using the second templates. The server may configure the second templates depending on at least one of the driving status information, the boarding type of the passenger, or the surrounding environment information.

The operating method may further include receiving, by the first terminal, a plurality of templates corresponding to a plurality of selectable options through the second communication UI from a server, selecting, by the first terminal, a plurality of second templates corresponding to the second options from among the templates depending on at least one of the driving status information, the boarding type of the passenger, or the surrounding environment information, and configuring, by the first terminal, the second communication UI by using the second templates.

According to embodiments, it is possible to support smooth communication between a driver and a passenger of a taxi vehicle.

Figure 1:
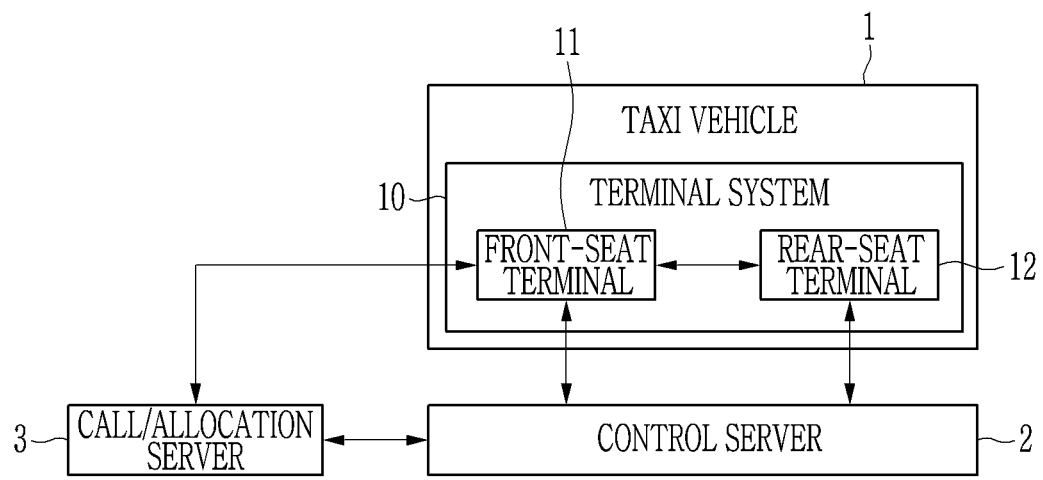
FIG. 1 illustrates an embodiment of a system for providing two-way communication between a driver and a passenger in a taxi vehicle.

The following elements may be used in connection with the drawings to describe embodiments of the present invention.

1: taxi vehicle
10: terminal system
11: front-seat terminal
12: rear-seat terminal
111: communication device of front-seat terminal
112: storage device of front-seat terminal
113: input device of front-seat terminal
114: display device of front-seat terminal
115: sound output device of front-seat terminal
116: control device of front-seat terminal
121: communication device of rear-seat terminal
122: storage device of rear-seat terminal
123: input device of rear-seat terminal
124: display device of rear-seat terminal
125: sound output device of rear-seat terminal
126: control device of rear-seat terminal
2: control server
21: communication device of rear-seat terminal
22: storage device of control server
23: control device of control server
221: vehicle information DB
222: Template DB

DETAILED DESCRIPTION OF ILLUSTRATIVE EMBODIMENTS

Hereinafter, embodiments disclosed in the present specification will be described in detail with reference to the accompanying drawings. In the present specification, the same or similar components will be denoted by the same or similar reference numerals, and a repeated description thereof will be omitted.

Terms 'module' and/or '-unit' for components used in the following description are used only in order to easily describe the specification. Therefore, these terms do not have meanings or roles that distinguish them from each other in and of themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as 'first', 'second', and the like will be used only to describe various components, and are not to be interpreted as limiting these components. The terms are only used to differentiate one component from other components.

It is to be understood that when one component is referred to as being 'connected' or 'coupled' to another component, it may be connected or coupled directly to the other component or be connected or coupled to the other component with a further component intervening therebetween. On the other hand, it is to be understood that when one component is referred to as being 'connected or coupled directly' to another component, it may be connected to or coupled to the other component without another component intervening therebetween.

It will be further understood that terms 'comprises' or 'have' used in the present specification specify the presence of stated features, numerals, steps, operations, components, parts, or a combination thereof, but do not preclude the presence or addition of one or more other features, numerals, steps, operations, components, parts, or a combination thereof.

In addition, terms such as 'unit', 'group', 'module', and 'means' described in the specification indicate a unit that processes at least one function or operation, which may be implemented in hardware or software, or a combination of hardware and software.

FIG. 1 schematically illustrates an embodiment of a system for providing two-way communication between a driver and a passenger in a taxi vehicle.

Referring to FIG. 1, a system for providing two-way communication between a driver and a passenger in a taxi vehicle 1 may include a terminal system 10 positioned in the taxi vehicle 1, and a control server 2 connected to the terminal system 10 through a wireless communication network.

The terminal system 10 of the taxi vehicle 1 may include a plurality of terminals positioned in the taxi vehicle 1. The terminal system 10 may include a front-seat terminal 11 for a driver of the taxi vehicle 1 and a rear-seat terminal 12 for a passenger riding in a rear seat of the taxi vehicle 1. The front-seat terminal 11 may be coupled to a front seat of the taxi vehicle 1 or positioned adjacent to the front seat of the taxi vehicle 1. For example, the front-seat terminal 11 may be positioned on a dashboard in front of the front seat of the taxi vehicle 1. The rear-seat terminal 12 may be coupled to the rear seat of the taxi vehicle 1 or positioned adjacent to the rear seat of the taxi vehicle 1. For example, the rear-seat terminal 12 may be positioned in front of the passenger riding in the rear seat. The terminal system 10 may further include a high-pass terminal (not illustrated), a payment terminal (not illustrated), etc. connected to the front-seat terminal 11.

The front-seat terminal 11 is an in-vehicle infotainment (WI) device positioned within a distance where a driver can manipulate it in the taxi vehicle 1. The front-seat terminal 11 may perform functions related to driving of the taxi vehicle 1. For example, the front-seat terminal 11 may perform an app meter function, a call and allocation management function, a navigation function, and the like.

The front-seat terminal 11 may transmit information related to the driving status of the taxi vehicle 1 such as vehicle information (vehicle number, etc.) of the taxi vehicle 1, driver information (driver name, driver photo, license information, etc.), current position information, a vehicle speed, an expected arrival time at a destination, fare information, etc. to the rear-seat terminal 12.

The front-seat terminal 11 may communicate with the rear-seat terminal 12 to support communication between the driver and the passenger of the taxi vehicle 1. The front-seat terminal 11 may also transfer message information (guide information, request information, etc.) to be delivered to the passenger based on information that is inputted by the driver of the taxi vehicle 1, to the rear-seat terminal 12 of the taxi vehicle 1. When receiving the message information of the passenger from the rear-seat terminal 12, the front-seat terminal 11 may display it on a screen to transfer it to the driver. The front-seat terminal 11 may receive destination position information inputted by the passenger from the rear-seat terminal 12 as the message information. When receiving the destination position information from the rear-seat terminal 12, the front-seat terminal 11 may execute a navigation function to provide path guide information to a destination based on the destination position information received from the rear-seat terminal 12.

The rear-seat terminal 12 is an WI device positioned within a distance where a passenger riding in the rear seat of the taxi vehicle 1 can manipulate it. The rear-seat terminal 12 may provide information related to the driving of the taxi vehicle 1 to the passenger riding in the taxi vehicle 1. The rear-seat terminal 12 may display vehicle information (vehicle number, etc.) of the taxi vehicle 1, driver information (driver name, driver photo, license information, etc.), current position information, a vehicle speed, an expected arrival time at a destination, fare information, etc. on the screen to provide it to the passenger. Information related to a driving status of the taxi vehicle 1 may be transmitted to the rear-seat terminal 12. To this end, the rear-seat terminal 12 may receive the information related to the driving of the taxi vehicle 1 from the front-seat terminal 11.

The rear-seat terminal 12 may communicate with the front-seat terminal 11 to support communication between the driver and the passenger riding in the taxi vehicle 1. The rear-seat terminal 12 may also transfer message information (guide information, request information, etc.) to be delivered to the driver based on information that is inputted by the passenger riding the taxi vehicle 1, to the front-seat terminal 11 of the taxi vehicle 1. The rear-seat terminal 12 may receive destination information from the passenger riding in the taxi vehicle 1 to transfer message information including the destination information to the front-seat terminal 11. When receiving the message information (guide information or request information) of the driver from the front-seat terminal 11, the rear-seat terminal 12 may display it on a screen to transfer it to the passenger.

The front-seat terminal 11 and the rear-seat terminal 12 may each display a communication user interface (UI) (hereinafter referred to as a 'communication UI') for receiving message information for communication between the driver and the passenger on a screen. In the present embodiment, corresponding message information may be transferred to the front-seat terminal 11 or the rear-seat terminal 12 only by performing a selection input to select a specific option in the communication UI by implementing repeatedly used messages in the form of options that can be selected in the communication UI. A template may be used to implement each of the messages in the form of a selectable option in the communication UI. Herein, the template may indicate a UI object for receiving a selection input for a corresponding option (message).

The front-seat terminal 11 and the rear-seat terminal 12 may receive templates that are used for a configuration of the communication UI and meta information thereof from the control server 2. Herein, the meta information of each of the templates may include type information, message information (guide information or request information), usage condition information, and the like. Herein, the type information may indicate which types (e.g., taxi driving, weather, fare, destination, etc.) the corresponding option (message) is related to. In addition, the message information includes information (guide information or request information) transferred to an opposite terminal (front-seat terminal 11 or rear-seat terminal 12) in response to a corresponding option, i.e., template, when it is selected in the communication UI. The message information may include, e.g., a character string displayed on the screen of the opposite terminal (the front-seat terminal 11 or the rear-seat terminal 12) when a corresponding option is selected. In addition, the usage condition information may indicate in which situation the corresponding template is used for the configuration of the communication UI. For example, the usage condition information may include a driving status (start and complete (end) of passenger transportation, rapid acceleration and deceleration, indoor temperature, etc.) of the taxi vehicle 1 for the corresponding template to be included in the communication UI, boarding types of passengers (passengers using a call/allocation service or passengers boarding during general roaming business), environmental conditions (weather, time zone, etc.), and the like.

The front-seat terminal 11 or the rear-seat terminal 12 may configure the communication UI by selecting a template that is suitable for a current situation of the taxi vehicle 1 based on meta information of each template. Typically, a talk between the driver and the passenger in a situation where the taxi vehicle 1 starts transportation of the passenger and a talk between the driver and the passenger in a situation where the taxi vehicle 1 completes the transportation of the passenger may be different. In addition, a talk between the driver and the passenger in a situation where the taxi vehicle 1 is normally performing the transportation and a talk between the driver and the passenger in a situation where a specific event (e.g. rapid acceleration or deceleration) occurs in the taxi vehicle 1 may be different. Similarly, a talk between the driver and the passenger in a situation where a passenger boards the taxi vehicle 1 using the call/allocation service and a talk between the driver and the passenger in a situation where a passenger boards the taxi vehicle 1 in a general roaming area may be different. In addition, a talk between the driver and the passenger may vary depending on weather, a current time, and a current position (city or suburban) of the taxi vehicle 1. Accordingly, when exposing the communication UI to a screen, the front-seat terminal 11 or the rear-seat terminal 12 may select templates used in the configuration of the communication UI such that the options (messages) that are likely to occur in the current situation of the taxi vehicle 1 are preferentially exposed on the screen.

The control server 2 may generate and manage templates used for the configuration of the communication UI of the terminal system 10 and meta information of each of the templates. To this end, the control server 2 may generate a list of messages that may occur between the taxi driver and the passenger. Herein, the messages may include guide information, requests, and the like that may occur between the taxi driver and the passenger. The control server 2 may standardize the messages that may occur between the taxi driver and the passenger to generate the list of the messages.

The control server 2 may continuously collect message information transmitted or received between the front-seat terminal 11 and the rear-seat terminal 12 of the taxi vehicle 1 to generate the list. In addition, the control server 2 may collect messages that may occur between the taxi driver and the passenger by reflecting requests received from taxi drivers. In the latter case, the taxi drivers may transmit information related to message information (guide information, requests, etc.) that can be exchanged with the passenger during driving to the control server 2 by accessing the control server 2 through one's own terminal (not illustrated) or the front-seat terminal 11.

When the list of the messages is generated, the control server 2 may generate a template for each message included in the list. Herein, the template may indicate a UI object for receiving a selection input for a corresponding message (option) in the communication UI.

The control server 2 may also generate meta information for each template. The meta information of each of the templates may include type information, message information (guide information or request information), usage condition information, and the like. The type information may indicate which types (e.g., taxi driving, weather, fare, destination, etc.) the corresponding message (option) is related to. The message information may include information transferred to the opposite terminal (the front-seat terminal 11 or the rear-seat terminal 12) when a corresponding template is selected. The usage condition information may include a driving status (start and completion of passenger transportation, rapid acceleration and deceleration, indoor temperature, etc.) of the taxi vehicle 1 as information related to a condition that the corresponding template is included in the communication UI, boarding types of passengers (passengers using a call/allocation service or passengers boarding during general roaming business), environmental conditions (weather, time zone, etc.), and the like.

Templates generated by the control server 2 and their meta information may be transmitted to a terminal system (front-seat terminal 11 or rear-seat terminal 12) in the taxi vehicle 1. The templates and meta information transmitted from the control server 2 to the terminal system 10 in the taxi vehicle 1 may be used to configure the communication UI for two-way communication between the driver and the passenger in the terminal system 10.

When transmitting the templates to the terminal system 10 of the taxi vehicle 1, the control server 2 may selectively transmit only a template that is suitable for a current situation of the taxi vehicle 1 (a driving status, a boarding type of the passenger who has boarded, a surrounding environment, etc.) of the taxi vehicle 1 to the terminal system 10 based on the meta information of each of the templates. To this end, the control server 2 may collect information related to the current situation of the taxi vehicle 1. For example, the control server 2 may collect information related to the driving status (start and completion of passenger transportation, rapid acceleration and deceleration, indoor temperature, etc.) of the taxi vehicle 1 from the terminal system 10 of the taxi vehicle 1. In addition, the control server 2 may obtain information related to driving circumstances of the taxi vehicle 1, such as weather information (e.g., temperature) and a current time of an area in which the taxi vehicle 1 is currently driving, from an external server (not illustrated). In addition, the control server 2 may acquire allocation information assigned to the taxi vehicle 1 from a call/allocation server 3.

The control server 2 may be implemented as a part of a mobility platform, an intelligent transport system (ITS), a taxi operator system that manages the taxi vehicles 1, and a service system that manages the terminal systems 10, etc.

The call/allocation server 3 is a server for providing a call/allocation service (or call taxi service) for the taxi vehicle 1. The call/allocation server 3 may receive a call request from a user who wants to use the call/allocation service, and may manage allocation of the taxi vehicle 1 for the received call request. When the allocation of the taxi vehicle 1 is determined in response to the call request of the user, the call/allocation server 3 may transmit allocation information for guiding the allocation determination to the front-seat terminal 11 of the taxi vehicle 1. The call/allocation server 3 may also transmit the allocation information to the control server 2. The allocation information may include call information (position information related to an origin and a destination) of a user, and vehicle information (vehicle number, driver information, etc.) of the taxi vehicle 1 allocated in response thereto.

The terminal system 10 of the taxi vehicle 1 may identify a boarding type of a passenger riding in the taxi vehicle 1 based on the allocation information received from the call/allocation server 3. That is, the front-seat terminal 11 may identify a passenger who boards the taxi vehicle 1 immediately after receiving allocation information from the call/allocation server 3 as a passenger who boarded it using the call/allocation service. In addition, when a passenger boards the taxi vehicle 1 in a state where there is no allocation information transmitted to the front-seat terminal 11 from the current call/allocation server 3, the front-seat terminal 11 may identify the corresponding passenger as a passenger who boarded during the roaming business of the taxi vehicle 1.

The control server 2 may also identify a boarding type of a passenger riding in the taxi vehicle 1 based on the allocation information received from the call/allocation server 3. When receiving allocation information for the taxi vehicle 1 from the call/allocation server 3, the control server 2 may identify a passenger who boards the taxi vehicle 1 immediately as a passenger who boarded it using the call/allocation service. When passenger boarding of the taxi vehicle 1 is confirmed in a state of receiving no allocation information assigned to the taxi vehicle 1 from the current call/allocation server 3, the control server 2 may also identify the corresponding passenger as a passenger who boarded during the roaming business of the taxi vehicle 1.

Hereinafter, the terminal system 10 of the taxi vehicle 1 of FIG. 1 will be described in more detail with reference to FIG. 2 and FIG. 3.

Figure 2:
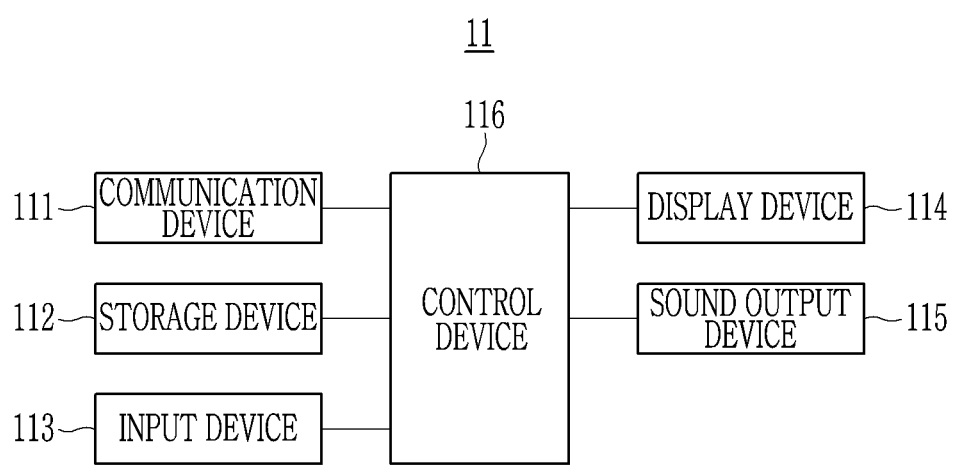
FIG. 2 schematically illustrates a front-seat terminal of a taxi vehicle according to an embodiment.

FIG. 2 illustrates a schematic structural diagram of the front-seat terminal 11 of the terminal system 10.

Referring to FIG. 2, the front-seat terminal 11 may include a communication device 111, a storage device 112, an input device 113, a display device 114, a sound output device 115, and a control device 116.

The communication device 111 may transmit or receive information between the front-seat terminal 11 and an external device through wired or wireless communication. Herein, the external device may include a device positioned inside the taxi vehicle 1 as well as a device positioned outside the taxi vehicle 1. For example, the communication device 111 may transmit and receive information between the front-seat terminal 11 and the rear-seat terminal 12, between the front-seat terminal 11 and the control server 2, or between the front-seat terminal 11 and the call/allocation server 3.

The storage device 112 may include one or more recording media that is readable by a processor, and may store programs for operation of the front-seat terminal 11. The storage device 112 may store various types of information or data processed by the front-seat terminal 11. The storage device 112 may store templates for configuring a communication UI and meta information thereof. The storage device 112 may include information related to a driving status of the taxi vehicle 1, e.g., information related to a current position of the taxi vehicle 1, a vehicle speed, an indoor temperature, a brake pedal operation state, an accelerator pedal operation state, a passenger boarding state, whether passenger transportation is started or completed, etc. The storage device 112 may also store allocation information received from the call/allocation server 3.

The input device 113 is an interface device that detects manipulation of the front-seat terminal 11 by a driver. The input device 113 may include an input device such as a touch sensor (or a touch pad) that detects touch manipulation of the driver, a push button, and a jog wheel.

The display device 114 may display various types of information that is processed by the front-seat terminal 11 on a screen of the front-seat terminal 11. For example, the display device 114 may display a communication UI (hereinafter, referred to as a 'driver communication UI') for receiving message information to be transferred from the driver to the passenger. The display device 114 may display a navigation UI including a current position of the taxi vehicle 1 and path guide information to a destination. The display device 114 may display a meter UI.

The display device 114 may be integrated with a touch sensor of the input device 113 to constitute a touch screen. In this case, the touch screen may operate as an interface device that displays various information on a screen and receives a user input generated by touch manipulation of a driver.

The sound output device 115 may output a sound signal related to a function (e.g., a navigation function, a call/allocation management function, a communication function, etc.) performed by the front-seat terminal 11.

The control device 116 may control a general operation of the front-seat terminal 11.

The control device 116 may execute an app meter function that calculates a driving fare of the taxi vehicle 1 based on a travel distance of the taxi vehicle 1. When the app meter function is executed, the control device 116 may display the meter UI on the screen of the front-seat terminal 11 through the display device 114. The meter UI may include selection buttons (or touch buttons) such as an 'empty car' button, a 'payment' button, an 'outside city' button, a 'town' button, and a 'surcharge' button. Such selection buttons may be configured as touch buttons, and may be selected by touch manipulation of a driver. The selection buttons included in the meter UI may be selected differently depending on a business mode (an empty car mode, a boarding reservation mode, a passenger boarding mode, etc.) of the taxi vehicle 1.

The 'outside city' button and the 'town' button are buttons for selecting a base fare of the taxi vehicle 1 among the selection buttons of the meter UI. When a passenger boards the taxi vehicle 1, a driver may select (or touch) the 'outside city' button and the 'town' button on the meter UI displayed on the front-seat terminal 11 to determine the base fare of a driving fare. Accordingly, when the 'outside city' button or the 'town' button is selected by the driver, the control device 116 may recognize that the taxi vehicle 1 has started passenger transportation. When the app meter function and the navigation function are activated, the control device 116 may recognize that the taxi vehicle 1 has started passenger transportation.

When recognizing that the taxi vehicle 1 has started passenger transportation, the control device 116 may set the business mode of the taxi vehicle 1 to the passenger boarding mode. In addition, the control device 116 may transmit information (hereinafter, referred to as 'passenger transportation start information') notifying that the taxi vehicle 1 has started passenger transportation to the rear-seat terminal 12 and the control server 2. The control device 116 may transmit vehicle information (vehicle number, etc.) of the taxi vehicle 1, or driver information (a driver photo, a driver name, license information, etc.) to the rear-seat terminal 12.

As the passenger transportation is started, the control device 116 may periodically acquire a travel distance, a travel time, etc. of the taxi vehicle 1 from a point in time when selection of the 'outside city' button or the 'town' button is sensed. The control device 116 may calculate the driving fare of the taxi vehicle 1 based on the thus-obtained travel distance, travel time, and the like of the taxi vehicle 1. Herein, the driving fare is calculated in proportion to the travel distance and the travel time of the taxi vehicle 1, and may be different from a payment fare to be described later.

The control device 116 may display information related to the calculated driving fare on the screen of the front-seat terminal 11 through the meter UI. The control device 116 may periodically transmit the driving fare information calculated by the control device 116 to the rear-seat terminal 12 such that the driving fare information may be displayed on the screen of the rear-seat terminal 12.

Typically, when the taxi vehicle 1 arrives at a destination, the driver selects the 'payment' button of the meter UI to calculate the payment fare. Accordingly, when the selection of the 'payment' button of the meter UI is detected, the control device 116 may recognize that the passenger transportation has been completed and stop calculating the driving fare. The control device 116 may also determine the payment fare based on the driving fare calculated up to at a time point when selection of the 'payment' button is detected. When information related to an additional fare is inputted from the driver through the input device 113, the control device 116 may determine the payment fare by adding the additional fare to the final driving fare. When the taxi vehicle 1 drives a toll road, the control device 116 may receive information related to a toll (or high-pass fare) from a high-pass terminal (not illustrated) to determine the payment fare by adding the toll to the final driving fare. When the payment fare is determined, the control device 116 may display payment fare information through the meter UI. In addition, the control device 116 may transmit the payment fee information to the rear-seat terminal 12 such that the payment fare information can be displayed on the screen of the rear-seat terminal 12. The control device 116 may transmit the payment fare information to a payment terminal (not illustrated) for billing. When the payment fare is a payment fare for call/allocation driving, the control device 116 may transmit the calculated payment fare information to the call/allocation server 3.

The driver may select the 'empty car' button on the meter UI when the passenger gets off the taxi vehicle 1. When the selection of the 'empty car' button is detected, the control device 116 may reset the driving fare of the taxi vehicle 1 for next business, and may set the business mode of the taxi vehicle 1 to the empty car mode. In addition, the control device 116 may transmit information notifying that the taxi vehicle 1 has entered the empty car mode to the rear-seat terminal 12 in order to deactivate the rear-seat terminal 12.

The control device 116 may communicate with the call/allocation server 3 to perform a function of managing a call or allocation for the taxi vehicle 1. When call request information of a user (passenger) is received from the call/allocation server 3, the control device 116 may display it on the screen of the front-seat terminal 11 through the display device 114. The driver who has checked the call request information through the screen of the front-seat terminal 11 may determine whether to accept a call request thereof through the input device 113. When acceptance input of the driver for the received call request is detected, the control device 116 may transmit information requesting allocation of the taxi vehicle 1 for the received call request to the call/allocation server 3. When the allocation to the taxi vehicle 1 is determined by the call/allocation server 3 receiving the allocation request information, the control device 116 may receive allocation information from the call/allocation server 3. Herein, the allocation information may include position information of an origin and a destination of the user who requested a call thereof.

The control device 116 may perform a navigation function. To this end, the control device 116 may continuously acquire current position information of the taxi vehicle 1 through a position sensor based on a global positioning system (GPS). In addition, when the destination is determined, the control device 116 may acquire path guide information including a travel path along which it can travel from a current position of the taxi vehicle 1 to the destination, and an estimated arrival time corresponding thereto. Then, the control device 116 may display a navigation UI including the obtained path guide information on the screen of the front-seat terminal 11 through the display device 114. In addition, the control device 116 may transmit the path guide information and the current position information of the taxi vehicle 1 to the rear-seat terminal 12 such that the current position of the taxi vehicle 1 and the travel path to the destination can be displayed on the screen of the rear-seat terminal 12.

The control device 116 may determine a destination for path guide based on information that is inputted through the input device 113 of the front-seat terminal 11. In addition, the control device 116 may receive destination information that is inputted by the passenger from the rear-seat terminal 12, and may determine a destination for path guide based thereon. In addition, the control device 116 may acquire departure point position information or destination location information of the passenger from the allocation information received from the call/allocation server 3, and may determine a destination for path guide based thereon.

The control device 116 may also execute a communication function between the driver and the passenger through communication with the rear-seat terminal 12. When the communication function is executed, the control device 116 may display a driver communication UI for receiving message information to be transferred from the driver to the passenger on the screen of the front-seat terminal 11. The driver communication UI may include a plurality of options for selecting different messages, and each of the options may be included in the driver communication UI in the form of a template. Herein, each template used to configure the driver communication UI is a UI object for receiving a selection input for each option exposed through the driver communication UI. For example, the template may include a selection button (or touch button) for receiving a selection input for a corresponding option.

When a selection input for any one of a plurality of templates included in the driver communication UI is detected, the control device 116 may transmit predetermined message information to the rear-seat terminal 12 depending on a selected template. As each template is selected in the driver communication UI, the message information transmitted to the rear-seat terminal 12 may be obtained from meta information of each template. The meta information may include the message information transmitted to the rear-seat terminal 12 in the form of a character string when a corresponding template is selected. The message information transmitted from the front-seat terminal 11 to the rear-seat terminal 12 may include, e.g., 'Please wear a mask', 'Slowly driven', 'Tell me if it is cold', 'Tell me if it is hot', ' Night surcharge applies', 'Outside city surcharge applies', 'Please fasten your seat belt', 'Please check lost items', 'Beware of motorcycles', 'Please enter your destination', etc.

The control device 116 may use the templates received from the control server 2 and the meta information thereof as described above when configuring the driver communication UI.

When configuring the driver communication UI, the control device 116 may differently select templates used for configuring the driver communication UI depending on a current situation of the taxi vehicle 1 (a driving status, a passenger boarding type, a surrounding environment, etc.). That is, the control device 116 may differently select options exposed through the driver communication UI depending on the current situation of the taxi vehicle 1 when configuring the driver communication UI. For example, when the taxi vehicle 1 starts passenger transportation, the control device 116 may configure the driver communication UI to include a mask wearing request ('Please wear a mask'), a seat belt wearing request ('Please fasten your seat belt'), and the like as options. In addition, for example, when the taxi vehicle 1 completes passenger transportation, the control device 116 may configure the driver communication UI to include a lost and found confirmation request ('Please check lost and found'), a safety confirmation request when getting off ('Be careful with motorcycles'), and the like as options. For example, the control device 116 may also configure the driver communication UI to include a destination input request ('Please input a destination') as an option when the passenger riding in the taxi vehicle 1 is a passenger riding during the roaming business. For example, the control device 116 may also configure the driver communication UI to include a temperature control guide ('Tell me if it's cold' or 'Tell me if it's hot') as an option when an ambient temperature of the taxi vehicle 1 is out of a predetermined range, and an indoor temperature and the ambient temperature of the taxi vehicle 1 differ by more than a predetermined value.

The driving status of the taxi vehicle 1 referenced when configuring the driver communication UI may include whether passenger transportation of the taxi vehicle 1 is started/completed, rapid acceleration or deceleration occurrence, a current position, a vehicle speed, an indoor temperature, etc. The control device 116 may detect whether the taxi vehicle 1 starts the passenger transportation by detecting the selection of the 'outside city' button or the 'town' button of the meter UI. The control device 116 may detect whether the passenger transportation of the taxi vehicle 1 has been completed by detecting the selection of the 'payment' button of the meter UI. In addition, the control device 116 may also detect the occurrence of rapid acceleration or rapid deceleration of the taxi vehicle 1 based on a detection signal received from at least one sensor (e.g., a vehicle speed sensor, a brake pedal sensor, an accelerator pedal sensor, etc.) mounted in the taxi vehicle 1. In addition, the control device 116 may acquire current position information of the taxi vehicle 1 through a position sensor based on a GPS. The control device 116 may also acquire indoor temperature information of the taxi vehicle 1 through the temperature sensor positioned in a passenger room of the taxi vehicle 1.

The boarding type of the passenger referenced when configuring the driver communication UI may be determined depending on allocation information received from the call/allocation server 3. That is, the control device 116 may identify a passenger who boards the taxi vehicle 1 immediately after receiving allocation information from the call/allocation server 3 as a passenger who boarded it using the call/allocation service. In addition, when a passenger boards the taxi vehicle 1 in a state where there is no allocation information received from the current call/allocation server 3, the control device 116 may identify the corresponding passenger as a passenger who boarded during the roaming business of the taxi vehicle 1. When completing the passenger transportation depending on the allocation information received from the call/allocation server 3, the taxi vehicle 1 may complete and then delete the corresponding allocation information.

The surrounding environment information of the taxi vehicle 1 referenced when configuring the driver communication UI may include weather information (e.g., temperature) of an area in which the taxi vehicle 1 is currently driving, a current time, and the like. The surrounding environment information of the taxi vehicle 1 may be received from the control server 2 or a separate external server (not illustrated).

Templates used for configuring the driver communication UI may be selected by the control server 2 depending on a current situation of the taxi vehicle 1 (a driving status, a passenger boarding type, a surrounding environment, etc.). In this case, the control device 116 may transmit information related to the current situation of the taxi vehicle 1 to the control server 2, and may receive templates that are suitable for the current situation of the taxi vehicle 1 from the control server 2, to configure the driver communication UI.

The control device 116 may change templates constituting the driver communication UI based on a control input from the driver. That is, the driver may add or delete options exposed in the driver communication UI through a setting UI provided by the front-seat terminal 11.

The control device 116 may deactivate or activate the communication function depending on the driving status of the taxi vehicle 1. That is, the control device 116 may deactivate or activate the display of the driver communication UI depending on the driving status of the taxi vehicle 1. For example, when the vehicle speed of the taxi vehicle 1 is greater than or equal to a predetermined value in a state in which the passenger transportation of the taxi vehicle 1 is started, the control device 116 may deactivate the communication function until the vehicle speed of the taxi vehicle 1 decreases to a predetermined value or less or the passenger transportation of the taxi vehicle 1 is completed. When the communication function is deactivated, the control device 116 may not display the driver communication UI on the screen even when execution of the communication function is requested from the driver of the taxi vehicle 1. When the communication function is deactivated, the control device 116 may display the driver communication UI on the screen, but may deactivate the input function through the communication UI.

When message information of the passenger is received from the rear-seat terminal 12, the control device 116 may display the received message information on the screen of the front-seat terminal 11 through the display device 114. For example, the control device 116 may display the message information received from the rear-seat terminal 12 on the screen of the front-seat terminal 11 in the form of a pop-up window for a predetermined time. When the message information of the passenger is received from the rear-seat terminal 12, the control device 116 may output an acoustic signal corresponding to the received message information, or an alarm signal indicating reception of the message information through the sound output device 115.

Figure 3:
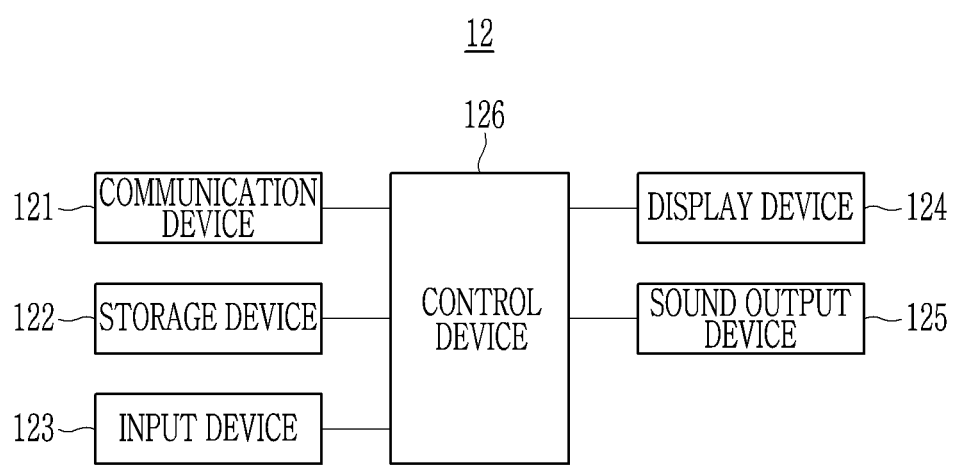
FIG. 3 schematically illustrates a rear-seat terminal of a taxi vehicle according to an embodiment.

FIG. 3 illustrates a schematic structural diagram of the rear-seat terminal 12 of the terminal system 10.

Referring to FIG. 3, the rear-seat terminal 12 may include a communication device 121, a storage device 122, an input device 123, a display device 124, a sound output device 125, and a control device 126.

The communication device 121 may transmit or receive information between the rear-seat terminal 12 and an external device of the rear-seat terminal 12 through wired or wireless communication. Herein, the external device may include a device positioned inside the taxi vehicle 1 as well as a device positioned outside the taxi vehicle 1. For example, the communication device 121 may transmit and receive information between the rear-seat terminal 12 and the front-seat terminal 11 and between the rear-seat terminal 12 and the control server 2.

The storage device 122 may include one or more recording media that is readable by a processor, and may store programs for operation of the rear-seat terminal 12. The storage device 122 may store various types of information or data processed by the rear-seat terminal 12. For example, the storage device 122 may store templates used for configuring a communication UI and meta information thereof.

The input device 123 is an interface device that detects manipulation of the rear-seat terminal 12 by a passenger. The input device 123 may include a touch sensor (or a touch pad), a push button, and the like.

The display device 124 may display various types of information that is processed by the rear-seat terminal 12. For example, the display device 124 may display information provided to the driver in relation to driving of the taxi vehicle 1 on the screen of the rear-seat terminal 12. In addition, for example, the display device 124 may display a communication UI (hereinafter, referred to as 'passenger communication UI') for receiving messages to be transferred to the driver from the passenger, on the screen of the rear-seat terminal 12.

The display device 124 may be integrated with a touch sensor of the input device 123 to constitute a touch screen. In this case, the touch screen may operate as an interface device that displays various information on a screen and receives a control input generated by touch manipulation of a driver.

The sound output device 125 may output a sound signal related to a function performed by the rear-seat terminal 12.

The control device 126 may control a general operation of the rear-seat terminal 12.

The control device 126 may operate the rear-seat terminal 12 in an inactive state (or sleep state) when the business mode of the taxi vehicle 1 is set to an empty car mode or a boarding reservation mode. The control device 126 may also operate the rear-seat terminal 12 in an activated state (or wake-up state) when the business mode of the taxi vehicle 1 is set to a passenger boarding mode. To this end, the rear-seat terminal 12 may receive information (e.g., passenger transportation start information) for recognizing the business mode of the taxi vehicle 1 from the front-seat terminal 11.

When the taxi vehicle 1 starts passenger transportation, the control device 126 may receive information related to driving of the taxi vehicle 1 from the front-seat terminal 11. The control device 126 may display the driving related information received from the front-seat terminal 11 on the screen of the rear-seat terminal 12 through the display device 124. The driving-related information received from the front-seat terminal 11 may include, e.g., vehicle information of the taxi vehicle 1, driver information, driving fare information, and path guide information (current position information, a travel path, an expected arrival time, etc.), and the like.

The control device 126 may also execute a communication function between the driver and the passenger through communication with the front-seat terminal 11. When the communication function is executed, the control device 126 may display a passenger communication UI for receiving message information to be transferred to the driver from the passenger on the screen of the rear-seat terminal 12. The passenger communication UI may include a plurality of options for selecting different messages, and each of the options may be included in the driver communication UI in the form of a template. Herein, each template used to configure the passenger communication UI is a UI object for receiving a selection input for each option exposed through the passenger communication UI. For example, the template may include a selection button (or touch button) for receiving a selection input for a corresponding option.

When a selection input for any one of a plurality of templates included in the passenger communication UI is detected, the control device 126 may transmit predetermined message information to the front-seat terminal 11 depending on a selected template. As each template is selected in the passenger communication UI, the message information transmitted to the front-seat terminal 11 may be obtained from meta information of each template. The meta information may include the message information transmitted to the front-seat terminal 11 in the form of a character string when a corresponding template is selected. The message information transmitted from the rear-seat terminal 12 to the front-seat terminal 11 may include, e.g., 'It's cold', 'It's hot', 'Please drive safely', 'I want to go quietly', 'Please open the window', 'Please reduce the volume', ' Please open the trunk', 'Please ventilate', 'Please go slowly', 'Please go quickly', etc.

The control device 126 may use the templates received from the control server 2 and the meta information thereof as described above when configuring the passenger communication UI.

When configuring the passenger communication UI, the control device 126 may differently select templates used for configuring the passenger communication UI depending on a current situation of the taxi vehicle 1 (a driving status, a passenger boarding type, a surrounding environment, etc.). That is, the control device 126 may differently select options exposed through the passenger communication UI depending on the current situation of the taxi vehicle 1 when configuring the passenger communication UI. For example, the control device 126 may configure the passenger communication UI to include a temperature adjustment request ('It's cold', 'It's hot', etc.) as an option when an indoor temperature of the taxi vehicle 1 is out of a predetermined range, and the indoor temperature and an ambient temperature of the taxi vehicle 1 differ by more than a predetermined value. For example, the control device 126 may also configure the passenger communication UI to include a safe driving request ('Please drive safely') as an option when the rapid acceleration or rapid deceleration of the taxi vehicle 1 is detected.

The driving status of the taxi vehicle 1 referenced when configuring the passenger communication UI may include whether passenger transportation of the taxi vehicle 1 is started/completed, rapid acceleration or deceleration occurrence, a current position, a vehicle speed, an indoor temperature, etc. The boarding type of the passenger referenced when configuring the passenger communication UI may indicate whether a passenger boarding the taxi vehicle 1 is a passenger boarded using a call/allocation service or a passenger boarded during a general roaming business of the taxi vehicle 1.

The surrounding environment information of the taxi vehicle 1 referenced when configuring the passenger communication UI may include weather information (e.g., temperature) of an area in which the taxi vehicle 1 is currently driving, a current time, and the like. The surrounding environment information of the taxi vehicle 1 may be information that is received from the control server 2 or a separate external server (not illustrated). Information referenced when configuring the passenger communication UI may be received from the front-seat terminal 11.

Templates used when configuring the passenger communication UI may be selected by the control device 116 of the front-seat terminal 11. In this case, the control device 116 of the front-seat terminal 11 may select templates used for configuring the passenger communication UI depending on a current situation of the taxi vehicle 1 (a driving status, a passenger boarding type, a surrounding environment, etc.), and the control device 126 of the rear-seat terminal 12 may configure the passenger communication UI by receiving the templates selected by the front-seat terminal 11.

Templates used when configuring the passenger communication UI may be selected by the control server 2. In this case, when the control device 116 of the front-seat terminal 11 transmits information related to the current situation of the taxi vehicle 1 to the control server 2, the control server 2 may select templates suitable for the current situation of the taxi vehicle 1 (a driving status, a passenger boarding type, a surrounding environment, etc.) to transmit them to the front-seat terminal 11, and the control device 116 of the front-seat terminal 11 may transmit this to the control device 126 of the rear-seat terminal 12.

The control device 126 may change the templates used to configure the passenger communication UI based on a control input of the driver transferred from the front-seat terminal 11. That is, the driver may add or delete options exposed in the passenger communication UI of the rear-seat terminal 12 through the setting UI provided by the front-seat terminal 11.

When message information inputted by the driver is received from the front-seat terminal 11, the control device 126 may display the received message information on the screen of the rear-seat terminal 12 through the display device 124. For example, the control device 126 may display the message information received from the front-seat terminal 11 on the screen of the rear-seat terminal 12 in the form of a pop-up window for a predetermined time. When the message information of the driver is received from the front-seat terminal 11, the control device 126 may output an acoustic signal corresponding to the received message information, or an alarm signal indicating reception of the message information through the sound output device 125.

The control device 126 may display a destination input UI for receiving destination information from the passenger on the screen of the rear-seat terminal 12 through the display device 124. When destination information is inputted from the passenger through the destination input UI, the control device 126 may transmit the inputted destination information to the front-seat terminal 11.

The control device 126 may receive advertisement contents from the front-seat terminal 11 or the control server 2, and may display it on the screen of the rear-seat terminal 12 through the display device 124.

Figure 4:
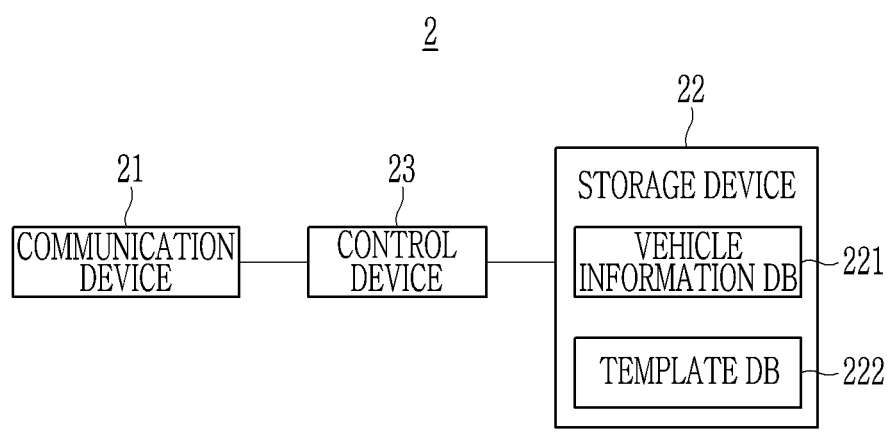
FIG. 4 schematically illustrates a control server of a taxi vehicle according to an embodiment.

FIG. 4 illustrates a schematic structural diagram of the control server 2.

Referring to FIG. 4, the control server 2 may include a communication device 21, a storage device 22, and a control device 23.

The communication device 21 may transmit or receive information between the control server 2 and an external device through a communication network. For example, the communication device 21 may transmit or receive information between the control server 2 and the call/allocation server 3, between the control server 2 and the front-seat terminal 11 of the taxi vehicle 1, or between the control server 2 and the rear-seat terminal 12 of the taxi vehicle 1.

The storage device 22 includes at least one recording medium that is readable by a processor, and may store various types of information processed by the control server 2. The storage device 22 may include a vehicle information database (DB) 221 and a template DB 222.

The vehicle information DB 221 may store vehicle information of taxi vehicles 1 which are registered in the control server 2. The vehicle information may include a vehicle number and driver information (a name, a phone number, a photo, license information, evaluation information, etc.) for each of the taxi vehicles 1. The vehicle information may further include driving status information for each taxi vehicle 1. The driving status information may include information related to a current position, a vehicle speed, a passenger transportation status (transportation start/transportation completion), a driver manipulation status (e.g., rapid acceleration or deceleration occurring), an indoor temperature, and the like of each taxi vehicle 1. The vehicle information may further include call/allocation information of each taxi vehicle 1. The call/allocation information may include information indicating a current allocation status of each taxi vehicle 1 for the call/allocation service.

The template DB 222 may store templates used to configure a communication UI for communication between a driver and a passenger in the terminal system 10 of the taxi vehicle 1. In addition, the template DB 222 may map meta information of each template to each template to store it. Herein, the meta information may include type information of a corresponding template, message information, usage condition information, and the like. The type information may indicate which types (e.g., taxi driving, weather, fare, destination, etc.) the corresponding message (option) is related to. In addition, the delivery information includes information (guide information or request information) transferred to an opposite terminal (front-seat terminal 11 or rear-seat terminal 12) in response to a corresponding option, i.e., template, when it is selected in the communication UI. The message information may include, e.g., a character string displayed on the screen of the opposite terminal (the front-seat terminal 11 or the rear-seat terminal 12) when a corresponding option is selected. In addition, the usage condition information may indicate in which situation the corresponding template is used for the configuration of the communication UI. For example, the usage condition information may include a driving status (start and complete (end) of passenger transportation, rapid acceleration and deceleration, indoor temperature, etc.) of the taxi vehicle 1 for the corresponding template to be included in the communication UI, boarding types of passengers (passengers using a call/allocation service or passengers boarding during general roaming business), environmental conditions (weather, time zone, etc.), and the like.

The control device 23 may control a general operation of the control server 2.

The control device 23 may generate and manage templates used to configure the communication UI (driver communication UI or passenger communication UI) in the terminal system 10 of the taxi vehicle 1.

To this end, the control device 23 may communicate with the terminal system 10 of each taxi vehicle 1 to collect message information (guide information, request information, etc.) transmitted and received between the front-seat terminal 11 and the rear-seat terminal 12 of each terminal system 10. For example, the control device 23 may receive the message information transmitted and received from the front-seat terminal 11 to the rear-seat terminal 12 of each terminal system 10. The control device 23 may also receive information related to messages that can be exchanged with the passenger during driving of the taxi vehicle 1 from the taxi drivers. In this case, the taxi drivers may transmit information related to messages that can be exchanged with the passenger during driving to the control server 2 by accessing the control server 2 through one's own terminal (not illustrated) or the front-seat terminal 11. The control device 23 may generate a list of messages that may occur between the taxi driver and the passenger based on message information received from the terminal system 10 of each taxi vehicle 1 and message information received from the taxi drivers. Herein, the messages may include guide information, requests, and the like that may occur between the taxi driver and the passenger.

When the list of the messages is generated, the control device 23 may generate a template such that each of the messages included in the list may be included in the communication UI (driver communication UI or passenger communication UI) of the terminal system 10 in the form of a selectable option. In addition, the control device 23 may generate meta information for each template. The meta information of each of the templates may include type information, message information (guide information or request information), usage condition information, and the like.

The control device 23 may transmit the generated templates and their meta information to the terminal system (front-seat terminal 11 or rear-seat terminal 12) in the taxi vehicle 1. When transmitting the templates to the terminal system 10 of the taxi vehicle 1, the control device 23 may configure the templates to be transmitted to the terminal system 10 based on a current situation of the taxi vehicle 1 (a driving status, a boarding type of the passenger boarded, a surrounding environment, etc.) of the taxi vehicle 1. For example, when the taxi vehicle 1 starts passenger transportation, the control device 23 may transfer templates for exposing a seat belt wearing request, a mask wearing request, a night surcharge guidance, an outside city fare guidance, a safe driving request, etc. as options of the communication UI to the terminal system 10. In addition, for example, the control device 23 may transfer templates for exposing a lost and found confirmation request, a safety confirmation request when getting out, etc. to the terminal system 10 as a communication UI when the taxi vehicle 1 has completed the passenger transportation. For example, the control device 23 may also transfer a template for exposing a destination input request as an option of a communication UI to the terminal system 10 when the passenger riding in the taxi vehicle 1 is a passenger riding during the roaming business.

To this end, the control device 23 may collect information related to a current situation of the taxi vehicle 1. For example, the control device 23 may collect information related to the driving status (start and completion of passenger transportation, rapid acceleration and deceleration, indoor temperature, etc.) of the taxi vehicle 1 from the terminal system 10 of the taxi vehicle 1. In addition, the control device 23 may obtain information related to driving circumstances of the taxi vehicle 1, such as weather information (e.g., temperature) and a current time of an area in which the taxi vehicle 1 is currently driving, from an external server (not illustrated). In addition, the control device 23 may acquire allocation information assigned to the taxi vehicle 1 from a call/allocation server 3.

The control device 23 may also identify a boarding type of a passenger riding in the taxi vehicle 1 based on the allocation information received from the call/allocation server 3. When passenger boarding for the taxi vehicle 1 is confirmed immediately after receiving the allocation information for the taxi vehicle 1 from the call/allocation server 3, the control device may identify a corresponding passenger as a passenger who boarded it using the call/allocation service.

When passenger boarding of the taxi vehicle 1 is confirmed in a state of receiving no allocation information assigned to the taxi vehicle 1 from the current call/allocation server 3, the control device 23 may identify the corresponding passenger as a passenger who boarded during the roaming business of the taxi vehicle 1.

Hereinafter, an operation method for providing two-way communication between a driver and a passenger in the terminal system 10 of the taxi vehicle 1 will be described in detail with reference to FIG. 5 to FIG. 10.

Figure 5:
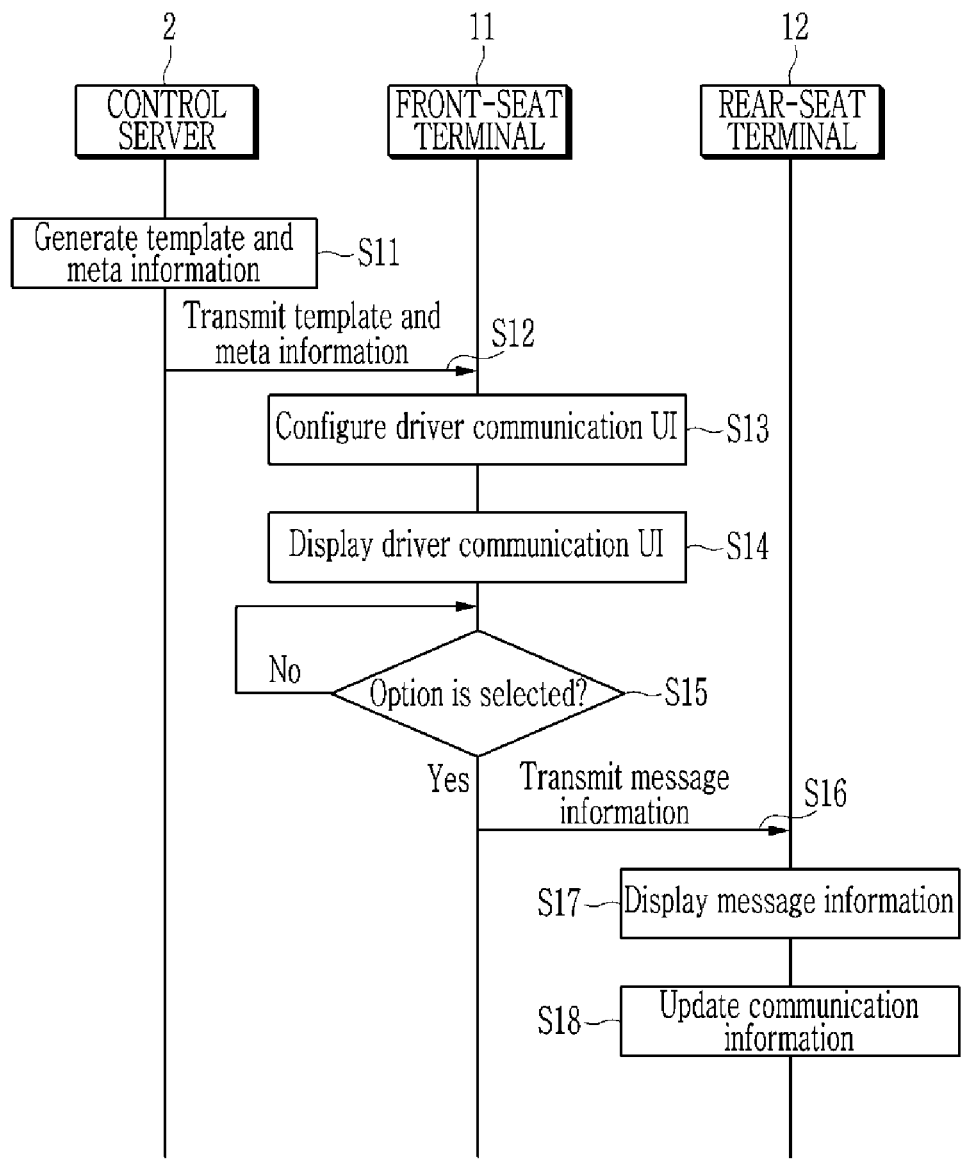
FIG. 5 illustrates an embodiment of a method for providing two-way communication in a terminal system for a taxi vehicle.

FIG. 5 illustrates an embodiment of a method for providing two-way direction communication in the terminal system 10 for a taxi vehicle.

Referring to FIG. 5, the control server 2 may generate a template and meta information that can be used to configure a communication UI in the terminal system 10 of the taxi vehicle 1 (S11).

In step S11, the control server 2 may generate a list of messages by collecting message information transferred between the front-seat terminal 11 and the rear-seat terminal 12 from the terminal system 10 of the taxi vehicles 1, or collecting information on necessary delivery items from taxi drivers. The control server 2 may generate a template for each message included in the list. In addition, the control server 2 may generate meta information of each template based on character strings for displaying each message on a screen, a situation requiring each message, and the like.

The control server 2 may transmit the generated templates and meta information to the front-seat terminal 11 of the taxi vehicle 1 (S12).

In step S12, when transmitting the templates to the front-seat terminal 11 of the taxi vehicle 1, the control server 2 may selectively transmit only a template that is suitable for a current situation of the taxi vehicle 1 (a driving status, a boarding type of the passenger boarded, a surrounding environment, etc.) of the taxi vehicle 1 to the front-seat terminal 11 based on the meta information of each of the templates.

The front-seat terminal 11 may configure a driver communication UI by using the templates and the meta information received from the control server 2 (S13), and may display the configured driver communication UI on the screen of the front-seat terminal 11 (S14).

In step S13, the templates used to configure the driver communication UI may vary depending on a current situation of the taxi vehicle 1. For example, the front-seat terminal 11 may also transmit information related to the current situation of the taxi vehicle 1 to the control server 2, and may receive templates that are suitable for the current situation of the taxi vehicle 1 from the control server 2, to configure the driver communication UI. In addition, for example, the front-seat terminal 11 may select templates suitable for the current situation of the taxi vehicle 1 from among the templates received from the control server 2, and may configure the driver communication UI by using the selected templates.

The driver communication UI displayed in step S14 may include messages that the driver can select in the form of options. In addition, each option in the driver communication UI may be implemented using a template in the form of a selection button (or touch button).

In step S14, the driver communication UI may be displayed on the screen of the front-seat terminal 11 when the driver requests execution of a communication function. The driver communication UI may be displayed on the screen of the front-seat terminal 11 when a specific event occurs in the taxi vehicle 1. For example, the front-seat terminal 11 may display the driver communication UI on the screen of the front-seat terminal 11 when passenger transportation of the taxi vehicle 1 is started. In addition, for example, the front-seat terminal 11 may also display the driver communication UI on the screen of the front-seat terminal 11 when the passenger transportation of the taxi vehicle 1 is completed.

In step S14, in the case where the driver communication UI is displayed on the screen of the front-seat terminal 11 in response to a specific event that has occurred in the taxi vehicle 1, the front-seat terminal 11 may disable the display of the driver communication UI when no driver input is detected for a predetermined time. That is, when no driver input occurs for a predetermined time in a state where the driver communication UI is displayed, the driver communication UI disappears from the screen of the front-seat terminal 11, and the screen of the front-seat terminal 11 may be changed to a previous state or a standby screen.

When any one of options included in the driver communication UI is selected (S15), the front-seat terminal 11 may transmit message information corresponding to the selected option to the rear-seat terminal 12 (S16).

In step S15, that any one of the options included in the driver communication UI is selected may be interpreted as selecting any one of templates constituting the driver communication UI.

In step S16, when any one option is selected, the front-seat terminal 11 may obtain message information to be transmitted to the rear-seat terminal 12 from meta information corresponding to the selected option.

After receiving the message information from the front-seat terminal 11, the rear-seat terminal 12 may display the received message information in the form of a pop-up window on the screen of the rear-seat terminal 12 for a predetermined time (S17). The rear-seat terminal 12 may display the message information received from the front-seat terminal 11 on the screen and, at the same time, may transmit an acoustic signal corresponding to the message information or an alarm signal notifying reception of the message information through the sound output device 125. When a predetermined time elapses while the pop-up window including the message information of the driver is displayed on the screen, the rear-seat terminal 12 may deactivate the display of the pop-up window and may return the screen of the rear-seat terminal 12 to a state before displaying the pop-up window.

The rear-seat terminal 12 may update communication information stored in the storage device 122 as it receives the message information from the front-seat terminal 11 (S18). Herein, the communication information may include information related to a history of exchange of information between the driver of the taxi vehicle 1 and the passenger, that is, information related to a history of message information transmitted and received between the front-seat terminal 11 and the rear-seat terminal 12.

Figure 6:
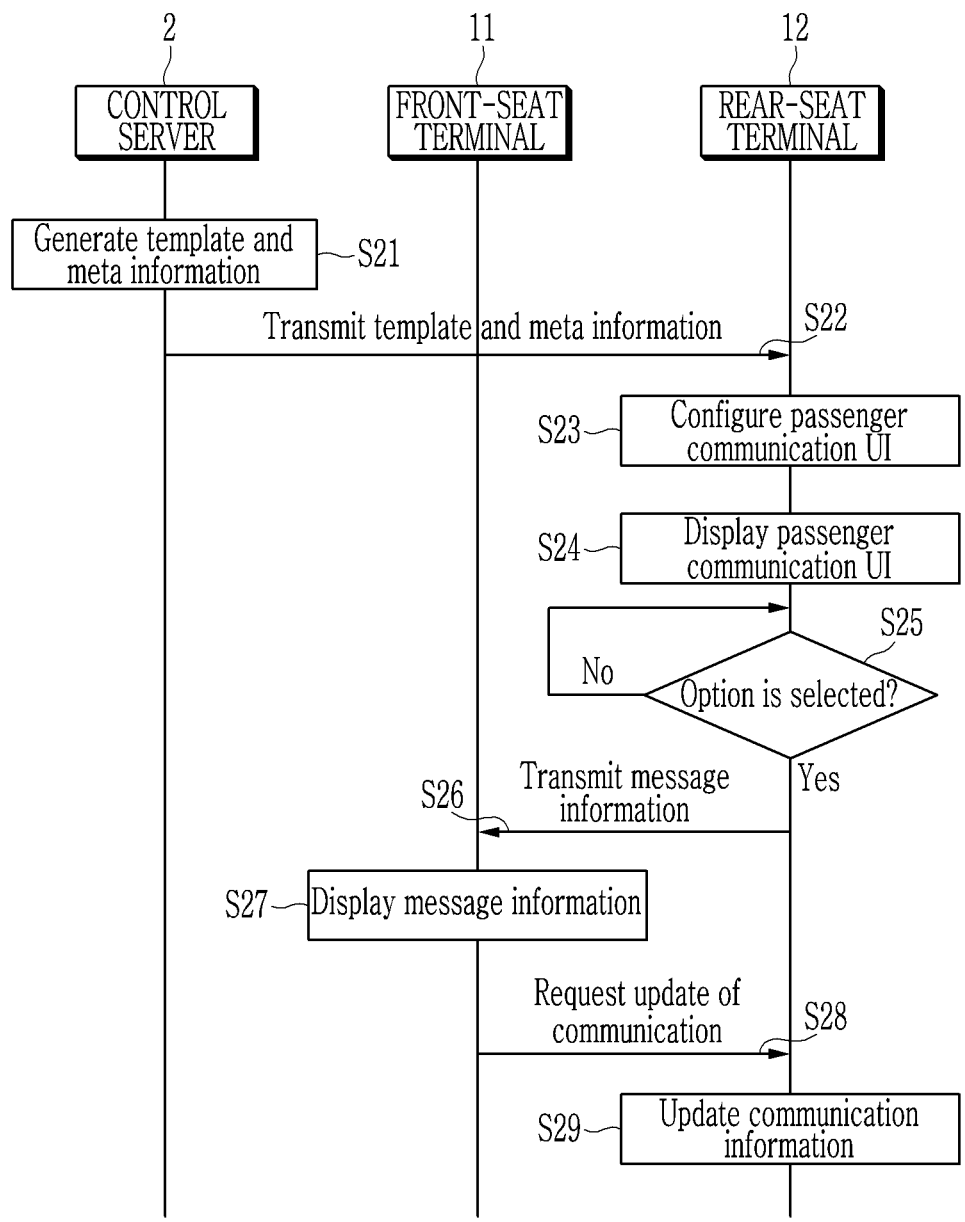
FIG. 6 illustrates another embodiment of a method for providing two-way communication in a terminal system for a taxi vehicle.

FIG. 6 illustrates another embodiment of a method for providing two-way communication in the terminal system 10 for a taxi vehicle.

Referring to FIG. 6, the control server 2 may generate a template and meta information that can be used to configure a communication UI in the terminal system 10 of the taxi vehicle 1 (S21). In addition, the control server 2 may transmit the generated templates and meta information to the rear-seat terminal 12 of the taxi vehicle 1 (S22).

In step S22, when transmitting the templates to the rear-seat terminal 12 of the taxi vehicle 1, the control server 2 may selectively transmit only a template that is suitable for a current situation of the taxi vehicle 1 (a driving status, a boarding type of the passenger boarded, a surrounding environment, etc.) of the taxi vehicle 1 to the rear-seat terminal 12 based on the meta information of each of the templates.

In step S22, when transmitting the templates and their meta information, the control server 2 may transmit them directly to the rear-seat terminal 12 or to the rear-seat terminal 12 through the front-seat terminal 11. In the latter case, when the control server 2 transmits the templates and the meta information to the front-seat terminal 11, the front-seat terminal 11 receiving the templates and the meta information may transmit the templates and the meta information to the rear-seat terminal 12.

The rear-seat terminal 12 may configure a passenger communication UI by using the templates and the meta information received from the control server 2 (S23), and may display the configured passenger communication UI on the screen of the rear-seat terminal 12 (S24).

In step S23, the templates used to configure the passenger communication UI may vary depending on a current situation of the taxi vehicle 1. For example, the rear-seat terminal 12 may configure the passenger communication UI by receiving templates suitable for the current situation of the taxi vehicle 1 from the control server 2 or the front-seat terminal 11. In addition, for example, the rear-seat terminal 12 may select templates suitable for the current situation of the taxi vehicle 1 from among the templates received from the control server 2, and may configure the passenger communication UI by using the selected templates.

The passenger communication UI displayed in step S24 may include messages that the passenger can select in the form of options. In addition, each option in the passenger communication UI may be implemented using a template in the form of a selection button.

In step S24, the passenger communication UI may be displayed on the screen of the rear-seat terminal 12 when the passenger requests execution of a communication function. The passenger communication UI may be displayed on the screen of the rear-seat terminal 12 when a specific event occurs in the taxi vehicle 1.

When any one of options included in the passenger communication UI is selected (S25), the rear-seat terminal 12 may transmit message information corresponding to the selected option to the front-seat terminal 11 (S26).

In step S25, that any one of the options included in the passenger communication UI is selected may be interpreted as selecting any one of templates constituting the passenger communication UI.

In step S26, when any one option is selected, the rear-seat terminal 12 may obtain message information to be transmitted to the front-seat terminal 11 from meta information corresponding to the selected option.

After receiving the message information from the rear-seat terminal 12, the front-seat terminal 11 may display the received message information in the form of a pop-up window on the screen of the front-seat terminal 11 for a predetermined time (S27). The front-seat terminal 11 may display the message information received from the rear-seat terminal 12 on the screen and, at the same time, may transmit an acoustic signal corresponding to the message information or an alarm signal notifying reception of the message information through the sound output device 115.

The front-seat terminal 11 may request the rear-seat terminal 12 to update communication information upon receiving the message information from the rear-seat terminal 12 (S28). Upon receiving the request, the rear-seat terminal 12 may update the communication information stored in the storage device 122 (S29).

Figure 7:
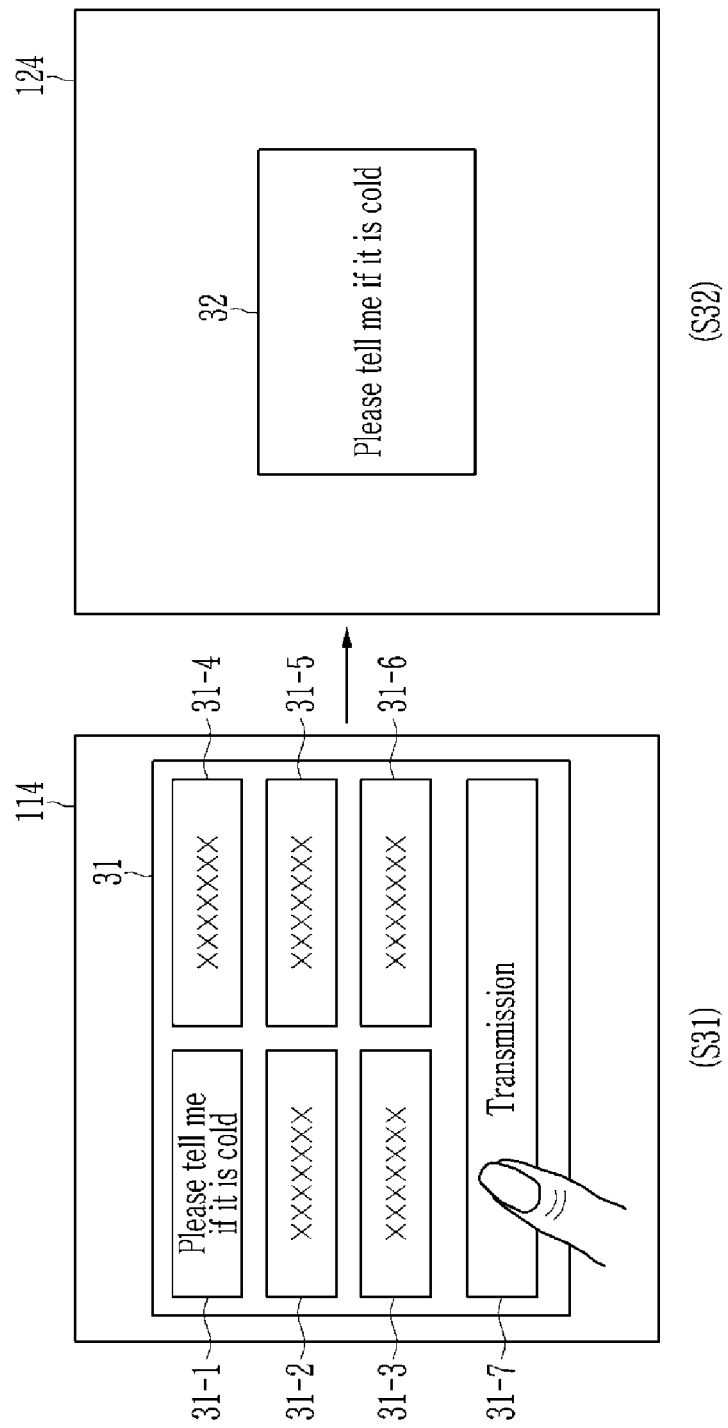
FIG. 7 illustrates an embodiment in which a front-seat terminal transmits a message of a driver to a rear-seat terminal in a terminal system of a taxi vehicle.

FIG. 7 illustrates an example in which the front-seat terminal 11 transmits a message of the driver to the rear-seat terminal 12 in the terminal system 10 of the taxi vehicle 1.

Referring to FIG. 7, a driver communication UI 31 may be displayed on the screen of the front-seat terminal 11 through the display device 114. The driver communication UI 31 may include a plurality of options 31-1 to 31-6 which are selectable by a driver, and a transmission button 31-7. Each of the options 31-1 to 31-6 and the transmission button 31-7 may be configured as a template in the form of a touch button for receiving a selection input.

When the transmission button 31-7 is touched while any one 31-1 of a plurality of options 31-1 to 31-6 included in the driver communication UI 31 is selected by the driver (S31), the front-seat terminal 11 may transmit message information ('Please tell me if it is cold') corresponding to the selected option to the rear-seat terminal 12.

Upon receiving the message information, the rear-seat terminal 12 may display a pop-up window 32 including the received message information ('Please tell me if it is cold') on the screen of the rear-seat terminal 12 for a predetermined time through the display device 124 (S32).

Figure 8:
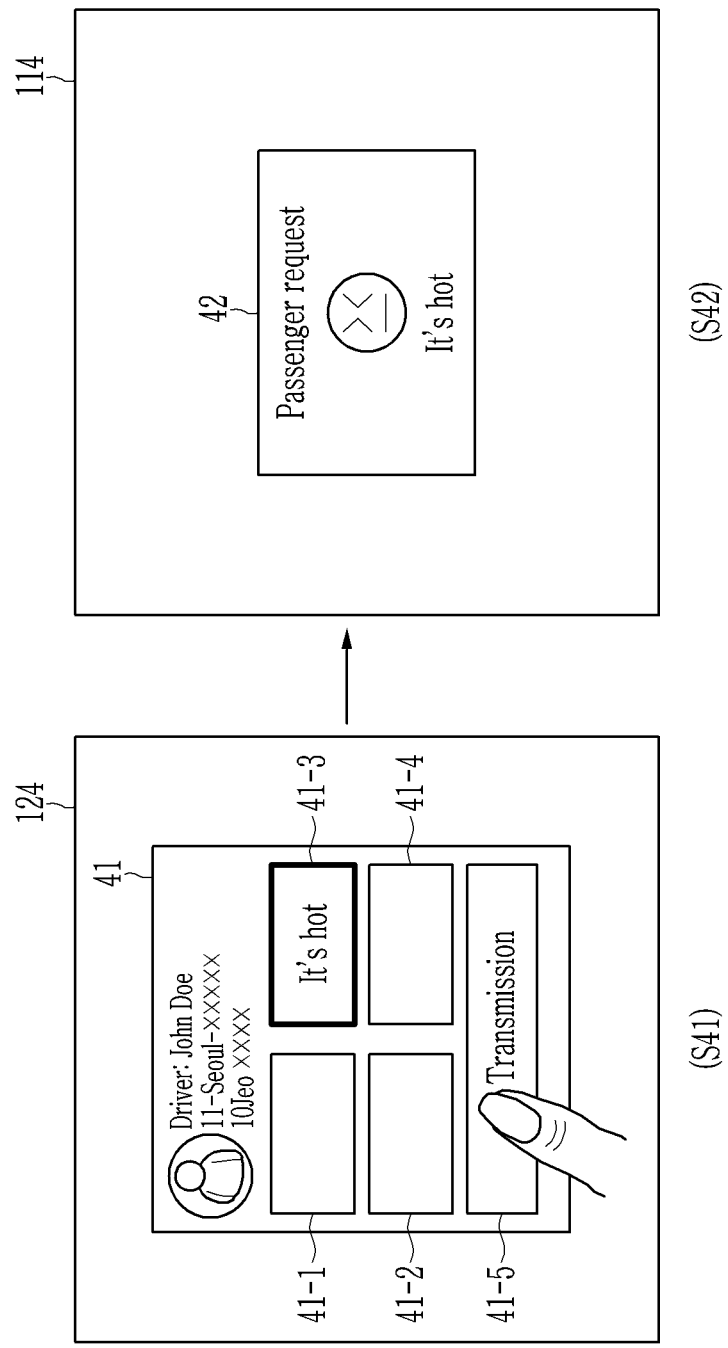
FIG. 8 illustrates an embodiment in which a rear-seat terminal transmits a message of a passenger to a front-seat terminal in a terminal system for a taxi vehicle.

FIG. 8 illustrates an example in which the rear-seat terminal 12 transmits a message of the passenger to the front-seat terminal 11 in the terminal system 10 of the taxi vehicle 1.

Referring to FIG. 8, a passenger communication UI 41 may be displayed on the screen of the rear-seat terminal 12 through the display device 124. The passenger communication UI 41 may include a plurality of options 41-1 to 41-4 which are selectable by a passenger, and a transmission button 41-5. Each of the options 41-1 to 41-4 and the transmission button 41-5 may be configured as a template in the form of a touch button for receiving a selection input.

When the transmission button 41-3 is touched while any one of a plurality of options 41-1 to 41-4 included in the passenger communication UI 41 is selected by the passenger (S41), the rear-seat terminal 12 may transmit message information ('It's hot') corresponding to the selected option to the rear-seat terminal 12.

Upon receiving the message information, the front-seat terminal 11 may display a pop-up window 42 including the received message information ('It's hot') on the screen of the front-seat terminal 11 for a predetermined time through the display device 114 (S42).

Figure 9:
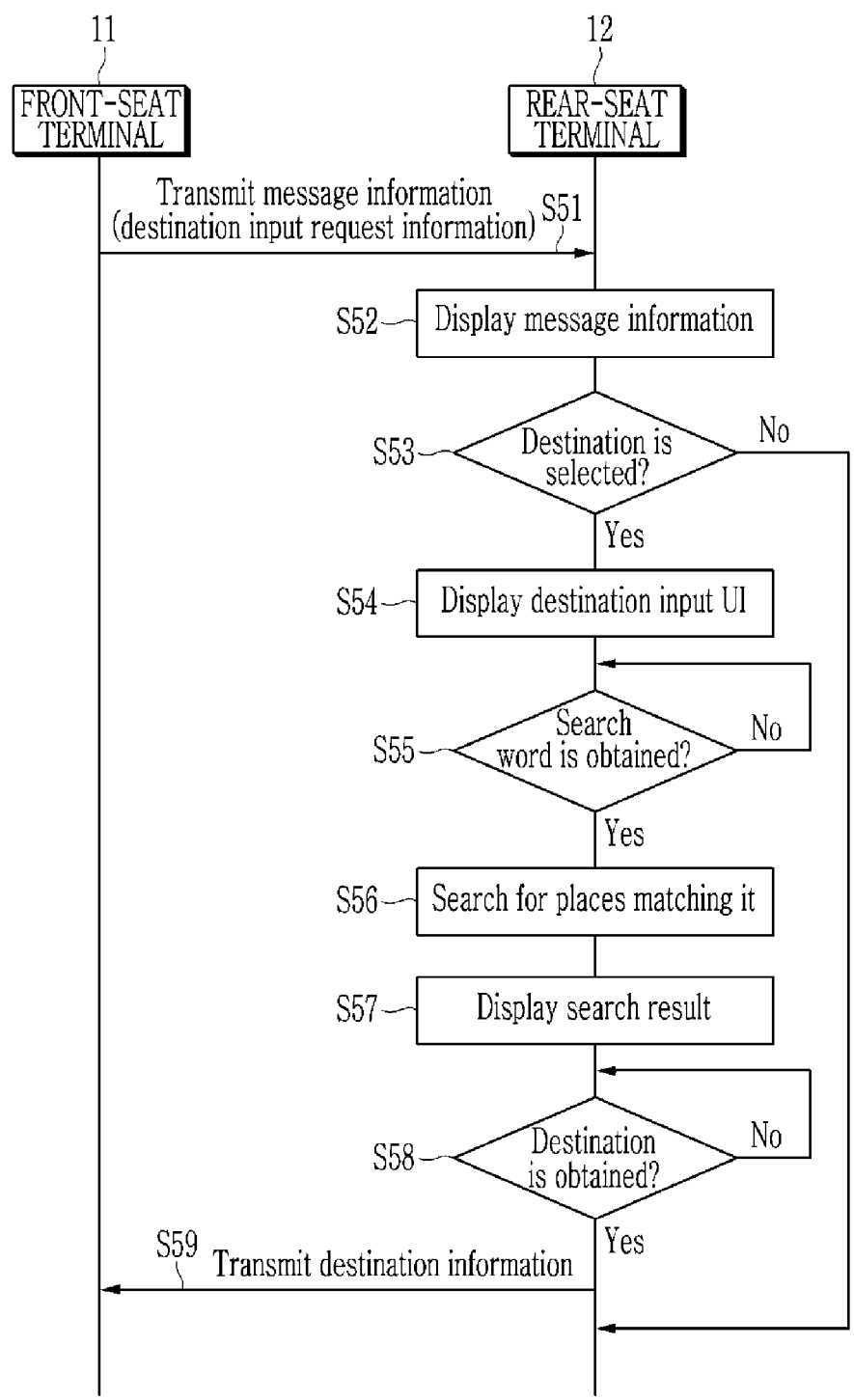
FIG. 9 illustrates an embodiment of a method of receiving destination information from a passenger in a terminal system for a taxi vehicle.

FIG. 9 illustrates an example of a method of receiving destination information from a passenger in the terminal system 10 of the taxi vehicle 1.

Referring to FIG. 9, when a destination input request is selected as a message by a driver, the front-seat terminal 11 transmits message information, i.e., destination input request information ('Please input a destination'), to the rear-seat terminal 12 (S51).

Upon receiving the message information, the rear-seat terminal 12 may display the message information ('Please input a destination') on a screen of the rear-seat terminal 12 in the form of a pop-up window (S52). Thereafter, when the destination input is selected by the passenger (S53), the rear-seat terminal 12 may display a destination input UI on the screen of the rear-seat terminal 12 (S54).

The rear-seat terminal 12 may obtain a search word for a destination search from the driver through the destination input UI (S55).

In step S55, the rear-seat terminal 12 may receive the search word for a destination search from the passenger through the destination input UI.

In step S55, the rear-seat terminal 12 may receive a plurality of initial consonants as search words from the passenger through the destination input UI. In this case, the rear-seat terminal 12 may extract candidate search words from map data based on the initial consonants inputted as the search words. That is, the rear-seat terminal 12 may extract places sequentially including the initial consonants in which place names are inputted from among the places registered in the map data. The rear-seat terminal 12 may display a list of extracted candidate search words through the destination UI, and may determine a search word finally selected from the list as the search word for the destination search. When configuring the list of the candidate search words, the rear-seat terminal 12 may configure the list of the candidate search words such that a place name having initial consonants entered through the destination input UI sequentially from a first letter are preferentially displayed, and a place name corresponding to a place that is closer to a current position of the taxi vehicle 1 is preferentially displayed.

In step S55, the rear-seat terminal 12 may display a list of recommended search words through the destination input UI, and may determine a search word selected from the list of the recommended search words as a search word for a destination search. The rear-seat terminal 12 may determine place names of places positioned within a predetermined distance based on the current position of the taxi vehicle 1 among places registered in map data as recommended search words. In this case, the rear-seat terminal 12 may preferentially select a place name of a place having a lot of numbers of times at which it is designated as a destination or departure point by users when using a call/allocation service as the recommended search word.

When the search word is obtained through step S55, the rear-seat terminal 12 may search the map data for places matching the obtained search word (S56). Then, the rear-seat terminal 12 may display a search result thereof on its own screen (S57). Herein, the search result may include a list of the places matching the search word.

When any one place is selected as a destination by the passenger in the search result displayed through step S57 (S58), the rear-seat terminal 12 may transmit position information of the place selected as the destination, i.e., destination information, to the front-seat terminal 11 (S59). Upon receiving the destination information from the rear-seat terminal 12, the front-seat terminal 11 may execute a navigation function to provide path guide information based on the destination information received from the rear-seat terminal 12.

Meanwhile, in FIG. 9, a case in which the rear-seat terminal 12 stores map data is illustrated as an example, but the rear-seat terminal 12 may store no map data. In this case, the rear-seat terminal 12 may transmit information inputted through the destination input UI to the front-seat terminal 11 to receive a list of search words and a list of places matching the search words from the front-seat terminal 11.

Figure 10:
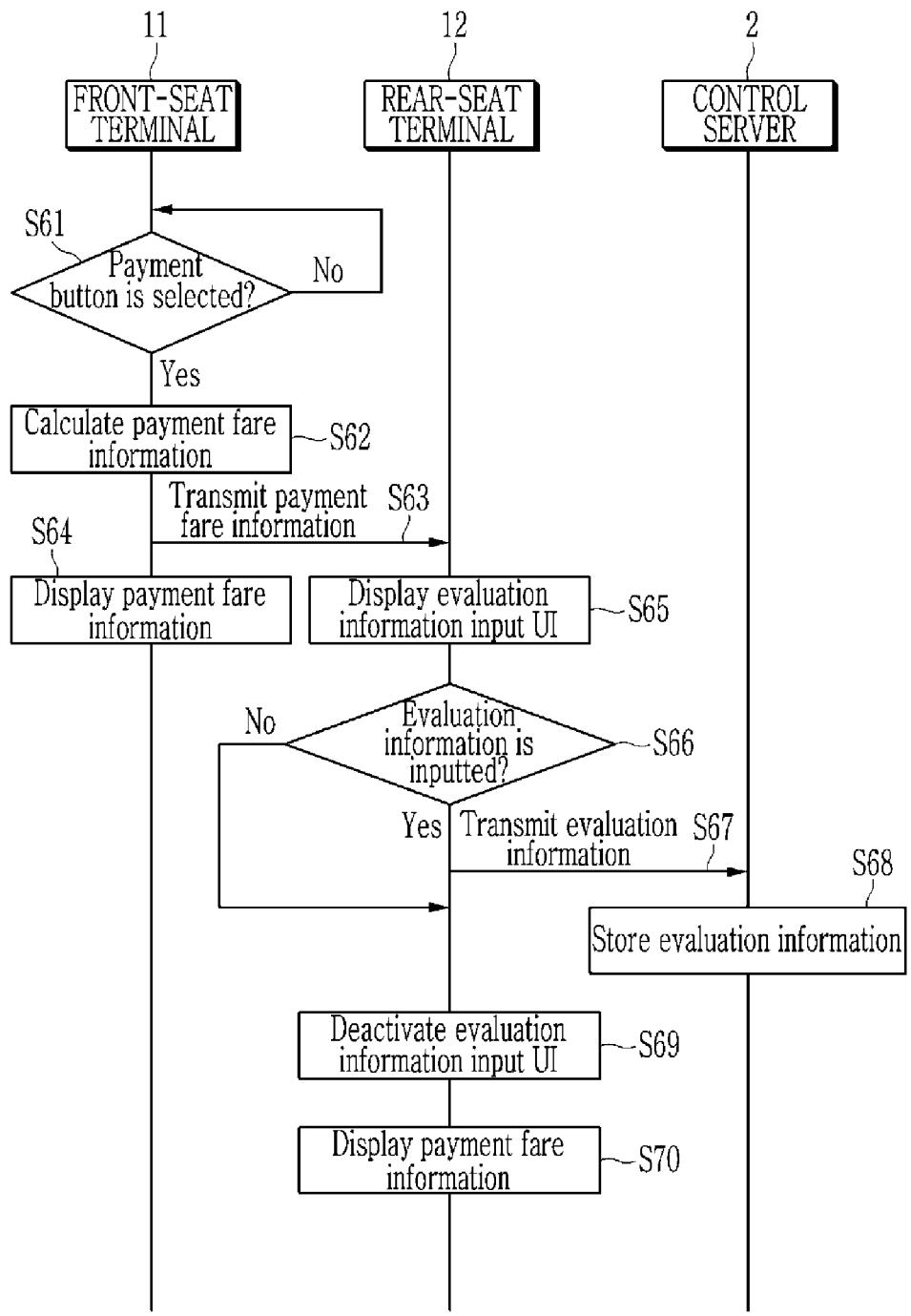
FIG. 10 illustrates an embodiment of a method of receiving evaluation information of a taxi driver from a passenger in a terminal system for a taxi vehicle.

FIG. 10 illustrates an example of a method of receiving evaluation information of a taxi driver from a passenger in the terminal system 10 of the taxi vehicle 1.

Referring to FIG. 10, when a 'payment' button of a meter UI is selected by the driver (S61), the front-seat terminal 11 may determine that a passenger has arrived at a destination and that passenger transportation is completed. Accordingly, the front-seat terminal 11 may calculate a payment fare for passenger transportation (S62).

The front-seat terminal 11 may transmit calculated payment fare information to the rear-seat terminal 12 (S63), and may display the payment fare information on a screen of the front-seat terminal 11 (S64).

Figure 11:
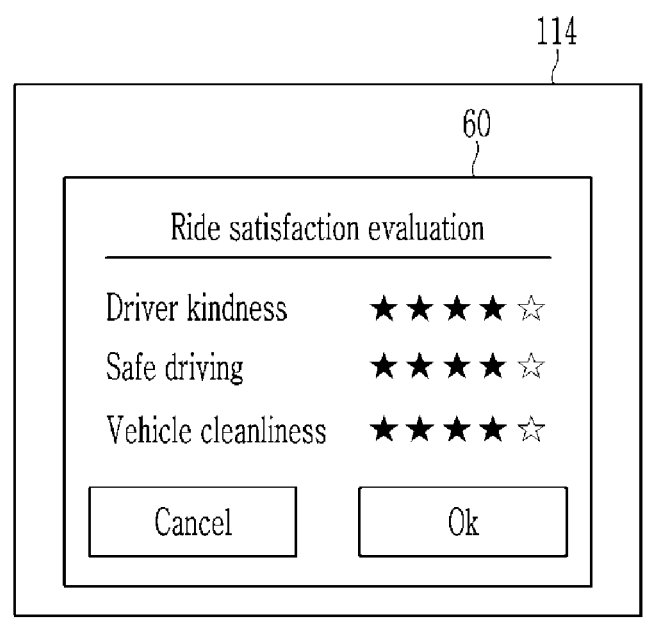
FIG. 11 illustrates an example of an evaluation information input UI displayed through a rear-seat terminal of a taxi vehicle.

After receiving the payment fare information from the rear-seat terminal 12, the rear-seat terminal 12 may display an evaluation information input UI for receiving evaluation information related to the driver on a screen of the rear-seat terminal 12 (S65). FIG. 11 illustrates an example of an evaluation information input UI displayed in the rear-seat terminal 12 to receive evaluation information. Referring to FIG. 1i, the evaluation information input UI may be displayed on a screen of the rear-seat terminal 12 in the form of a pop-up window 60.

When evaluation information is inputted from a passenger through the evaluation information input UI (S66), the rear-seat terminal 12 may transmit the evaluation information to the control server 2 (S67). The control server 2 receiving it may map the received evaluation information to a corresponding taxi vehicle and store it (S68).

The rear-seat terminal 12 may deactivate the display of the evaluation information input UI when no information is inputted through the evaluation information input UI for a predetermined time or more, or when the input of the evaluation information is completed (S69). That is, the rear-seat terminal 12 may close the pop-up window including the evaluation information input UI. Then, the rear-seat terminal 12 may display the payment fare information received from the front-seat terminal 11 on the screen of the rear-seat terminal 12 (S70).

In the above-described FIG. 10, when the rear-seat terminal 12 receives the payment fare information from the front-seat terminal 11, a case of displaying the evaluation information input UI is illustrated as an example, but embodiments are not limited thereto. In another embodiment, a time point at which the rear-seat terminal 12 displays the evaluation information input UI may be changed. For example, when the rear-seat terminal 12 detects selection of a 'payment' button in the front-seat terminal 11, and transmits a signal notifying that passenger transportation is completed to the rear-seat terminal 12 in response thereto, the evaluation information input UI may also be displayed on the screen. In addition, for example, the rear-seat terminal 12 may display the evaluation information input UI when an expected arrival time at a destination decreases below a predetermined value or a distance from a current position to the destination decreases below a predetermined value.

In addition, in FIG. 10, a case in which the rear-seat terminal 12 directly transmits the evaluation information inputted through the evaluation information input UI to the control server 2 is illustrated as an example, but the rear-seat terminal 12 may also transmit the evaluation information to the control server 2 through the front-seat terminal 11.

In the above-described exemplary embodiments, templates are generated in advance for the messages that are frequently used by the driver and the passenger, and when the communication UI is displayed on the screen in the terminal system 10, the messages are configured in the form of selectable options by using the templates generated in advance. Accordingly, the driver and the passenger may transfer a desired message to the other party (passenger and driver) only by a manipulation (e.g., a touch input) of selecting any one of the options exposed through the communication UI, thereby increasing convenience of the driver and the passenger. In addition, it is possible to improve the convenience of the driver and the passenger in a process of selecting options exposed through the communication UI by selecting the options depending on the current situation of the taxi vehicle.

A method of operating the terminal system in the taxi vehicle according to the above-described embodiments may be executed through software. When executed by software, constituent means of embodiments of the present invention are code segments that perform necessary tasks. Programs or code segments may be stored in a processor-readable recording medium or transmitted by a computer data signal combined with a carrier wave in a transmission medium or a communication network.

The computer-readable medium includes all kinds of recording devices that store data that can be read by a computer system. Examples of the computer-readable recording medium include a ROM, a RAM, a CD-ROM, a DVD_ROM, a DVD_RAM, a magnetic tape, a floppy disk, a hard disk, and an optical data storage device. In addition, the computer-readable recording medium may be distributed to network-connected computer devices to store and execute computer-readable codes in a distributed manner.

While embodiments of the present invention have been particularly shown and described with reference to the accompanying drawings, the specific terms used herein are only for the purpose of describing the invention and are not intended to define the meanings thereof or be limiting of the scope of the invention set forth in the claims. Therefore, a person of ordinary skill in the art may easily select it therefrom and replace it. In addition, a person of ordinary skill in the art may omit some of the components described herein without degrading performance, or may add components to improve performance. In addition, a person of ordinary skill in the art may change an order of the method steps described herein depending on a process environment or equipment. Accordingly, the scope of the present invention should be determined by the claims and their equivalents rather than the described embodiments.

What is claimed is:

1. A terminal system for a taxi vehicle, the terminal system comprising:
a first terminal positioned for a passenger of the taxi vehicle; and
a second terminal positioned for a driver of the taxi vehicle and configured to:
receive first templates from a server, the first templates corresponding to first options and based on driving status information of the taxi vehicle, a boarding type of the passenger, or surrounding environment information of the taxi vehicle;
configure a first communication user interface (UI) by using the first templates;
display the first communication UI for receiving information to be transferred from the driver to the passenger on a first screen; and
in response to any one of a plurality of first options included in the first communication UI being selected by the driver, generate first message information that is determined based on the selected any one first option and transmit the first message information to the first terminal, wherein the first options included in the first communication UI are chosen based on the driving status information of the taxi vehicle, the boarding type of the passenger, or the surrounding environment information of the taxi vehicle;
wherein the second terminal initiates two-way communication with the first terminal using the first communication UI;
wherein the driving status information of the taxi vehicle includes information related to whether the taxi vehicle starts passenger transportation or whether the taxi vehicle completes the passenger transportation;
wherein the boarding type of the passenger indicates whether the passenger boarding the taxi vehicle is a passenger boarded using a call/allocation service or a passenger boarded during a general roaming business of the taxi vehicle;
wherein the surrounding environment information includes weather information of an area in which the taxi vehicle is currently driving;
wherein the first templates include meta information for selecting corresponding second templates corresponding to second options to be used to configure a second communication UI at the first terminal and used to generate second message information from the passenger to the driver; and
wherein the first terminal, the second terminal, and the server are processor operated devices that execute instructions stored in a memory coupled to a processor.

2. The terminal system of claim 1, wherein the second terminal is configured to identify the boarding type of the passenger based on whether the passenger in the taxi vehicle used the call/allocation service to board the taxi vehicle or boarded by roaming business, based on allocation information received from a server configured to provide the call/allocation service.

3. The terminal system of claim 2, wherein:
the first options included in the first communication UI include a destination input request in response to the boarding type of the passenger being identified as the boarded by the roaming business; and
the second terminal is configured to transmit the first message information requesting a destination input to the first terminal in response to a selection input for the destination input request being detected in the first communication UI.

4. The terminal system of claim 3, wherein the second terminal is configured to generate path guide information to a destination based on destination information in response to the destination information being received in response to the first message information from the first terminal.

5. The terminal system of claim 1, wherein:
the first terminal is configured to display the second communication UI for receiving information to be transmitted from the passenger to the driver on a second screen, and in response to any one of the second options included in the second communication UI being selected, to transmit the second message information that is determined based on the selected any one second option to the second terminal; and
the second options included in the second communication UI are chosen based on the driving status information of the taxi vehicle, the boarding type of the passenger, or the surrounding environment information of the taxi vehicle.

6. The terminal system of claim 5, wherein:
the first terminal is configured to receive the second templates corresponding to the second options from the server, and is configured to configure the second communication UI by using the second templates; and
the server is configured to configure the second templates based on the driving status information of the taxi vehicle, the boarding type of the passenger, or the surrounding environment information of the taxi vehicle.

7. The terminal system of claim 5, wherein the first terminal is configured to:
receive a plurality of templates corresponding to a plurality of selectable options through the second communication UI from the server;
select a plurality of second templates corresponding to the second options from among the plurality of templates based on the driving status information of the taxi vehicle, the boarding type of the passenger, or the surrounding environment information of the taxi vehicle; and
configure the second communication UI by using the second templates.

8. The terminal system of claim 1, wherein the system further comprises the server, which is configured to configure the first templates based on the driving status information of the taxi vehicle, the boarding type of the passenger, or the surrounding environment information of the taxi vehicle.

9. The terminal system of claim 1, wherein the second terminal is configured to:
receive a plurality of templates corresponding to a plurality of selectable options through the first communication UI from the server;
select first templates corresponding to the first options from among the plurality of templates based on the driving status information of the taxi vehicle, the boarding type of the passenger, or the surrounding environment information of the taxi vehicle; and
configure the first communication UI by using the first templates.

10. The terminal system of claim 1, wherein:
the driving status information of the taxi vehicle includes an indoor temperature of the taxi vehicle and the surrounding environment information of the taxi vehicle includes an ambient temperature of the taxi vehicle; and
the first options included in the first communication UI include options related to temperature adjustment in response to the ambient temperature of the taxi vehicle being out of a predetermined range or a difference between the indoor temperature of the taxi vehicle and the ambient temperature being greater than or equal to a predetermined value.

11. The terminal system of claim 1, wherein, in response to receiving the first message information, the first terminal is configured to display the received first message information on a second screen in a pop-up window.

12. A method of operating a terminal system including a first terminal for a passenger of a taxi vehicle and a second terminal for a driver of the taxi vehicle, the method comprising:
receiving by the second terminal, a plurality of first templates corresponding to first options, the first templates being received from a server that has configured the first templates based on driving status information of the taxi vehicle, a boarding type of the passenger, or surrounding environment information of the taxi vehicle;
configuring, by the second terminal, a first communication user interface UI by using the first templates;
displaying, by the second terminal, the first communication user interface (UI) for receiving information to be transmitted from the driver to the passenger on a first screen;
in response to any one of first options included in the first communication UI being selected, generating, by the second terminal, first message information that is determined based on the selected any one first option and transmitting the first message information to the first terminal; and
displaying, by the first terminal, the first message information on a second screen, wherein the first options included in the first communication UI are chosen based on the driving status information of the taxi vehicle, the boarding type of the passenger, or the surrounding environment information of the taxi vehicle;
wherein the second terminal initiates two-way communication with the first terminal using the first communication UI;
wherein the driving status information of the taxi vehicle includes information related to whether the taxi vehicle starts passenger transportation or whether the taxi vehicle completes the passenger transportation;
wherein the boarding type of the passenger indicates whether the passenger boarding the taxi vehicle is a passenger boarded using a call/allocation service or a passenger boarded during a general roaming business of the taxi vehicle;
wherein the surrounding environment information includes weather information of an area in which the taxi vehicle is currently driving; and
wherein the first templates include meta information for selecting corresponding second templates corresponding to second options to be used to configure a second communication UI at the first terminal and used to generate second message information from the passenger to the driver.

13. The method of claim 12, further comprising identifying, by the second terminal, the boarding type of the passenger as boarding using the call/allocation service or boarding by roaming business based on allocation information received from a server that provides the call/allocation service.

14. The method of claim 13, wherein:
the first options included in the first communication UI include a destination input request in response to the boarding type of the passenger being identified as the boarding by the roaming business; and transmitting the first message information includes transmitting the first message information requesting a destination input to the first terminal in response to a selection input for the destination input request being detected in the first communication UI.

15. The method of claim 14, further comprising:

generating, by the second terminal, path guide information to a destination based on destination information in response to the destination information being received in response to the first message information from the first terminal; and displaying, by the second terminal, the path guide information on the first screen.

16. The method of claim 12, wherein:

the driving status information of the taxi vehicle includes an indoor temperature of the taxi vehicle and the surrounding environment information includes an ambient temperature of the taxi vehicle; and the first options included in the first communication UI include options related to temperature adjustment in response to the ambient temperature of the taxi vehicle being out of a predetermined range or a difference between the indoor temperature of the taxi vehicle and the ambient temperature being greater than or equal to a predetermined value.

17. The method of claim 16, further comprising:

displaying, by the first terminal, the second communication UI for receiving information to be transmitted from the passenger to the driver on the second screen;

receiving, by the first terminal, a plurality of templates corresponding to a plurality of selectable options through the second communication UI from the server;

selecting, by the first terminal, second templates corresponding to the second options from among the templates based on the driving status information of the taxi vehicle, the boarding type of the passenger, or the surrounding environment information of the taxi vehicle; and configuring, by the first terminal, the second communication UI by using the second templates.

18. The method of claim 12, further comprising:

displaying, by the first terminal, the second communication UI for receiving information to be transmitted from the passenger to the driver on the second screen;

in response to any one of the second options included in the second communication UI being selected, transmitting, by the first terminal, the second message information that is determined based on the selected any one second option to the second terminal, wherein the second options included in the second communication UI are chosen based on the driving status information of the taxi vehicle, the boarding type of the passenger, or the surrounding environment information of the taxi vehicle; and displaying, by the second terminal, the second message information on the first screen.

19. The method of claim 18, further comprising:

receiving, by the first terminal, a plurality of second templates corresponding to the second options from the server; and configuring, by the first terminal, the second communication UI by using the second templates; and configuring, by the server, the second templates based on the driving status information of the taxi vehicle, the boarding type of the passenger, or the surrounding environment information of the taxi vehicle.

20. The method of claim 12, further comprising:

receiving, by the second terminal, a plurality of templates corresponding to a plurality of selectable options through the first communication UI from the server;

selecting, by the second terminal, a plurality of first templates corresponding to the first options from among the templates based on the driving status information of the taxi vehicle, the boarding type of the passenger, or the surrounding environment information of the taxi vehicle; and configuring, by the second terminal, the first communication UI by using the first templates.

21. A method of operating a terminal system that includes a first terminal for a passenger of a taxi vehicle and a second terminal for a driver of the taxi vehicle, the method comprising:

configuring, by a server, a plurality of first templates corresponding to first options that are based on driving status information of the taxi vehicle, a boarding type of the passenger, or surrounding environment information of the taxi vehicle;

transmitting the first templates from the server to the second terminal;

using, by the second terminal, the first templates to configure a first communication user interface (UI);

displaying, by the second terminal, the first communication UI on a first screen accessible by the driver;

receiving, by the second terminal, a selection of any one of the first options included in the first communication from the driver;

generating, by the second terminal, first message information that is determined based on the selection of any one the first options;

transmitting the first message information from the second terminal to the first terminal; and displaying, by the first terminal, the first message information on a second screen that is viewable by the passenger;

wherein the second terminal initiates two-way communication with the first terminal using the first communication UI;

wherein the driving status information of the taxi vehicle includes information related to whether the taxi vehicle starts passenger transportation or whether the taxi vehicle completes the passenger transportation;

wherein the boarding type of the passenger indicates whether the passenger boarding the taxi vehicle is a passenger boarded using a call/allocation service or a passenger boarded during a general roaming business of the taxi vehicle;

wherein the surrounding environment information includes weather information of an area in which the taxi vehicle is currently driving; and wherein the first templates include meta information used for selecting corresponding second templates corresponding to second options to be used to configure a second communication UI at the first terminal and used to generate second message information from the passenger to the driver.

* * * * *

UNITED STATES PATENT AND TRADEMARK OFFICE
CERTIFICATE OF CORRECTION

| | |
|---|---|
| PATENT NO. | : 11,989,389 B2 |
| APPLICATION NO. | : 17/572999 |
| DATED | : May 21, 2024 |
| INVENTOR(S) | : Sojeong Kim |

It is certified that error appears in the above-identified patent and that said Letters Patent is hereby corrected as shown below:

In the Claims

In Column 32, in Claim 21, Line 37, delete "one the" and insert -- one of the --.

Signed and Sealed this
Second Day of July, 2024

Katherine Kelly Vidal
*Director of the United States Patent and Trademark Office*